US008145662B2

(12) United States Patent
Chen et al.

(10) Patent No.: US 8,145,662 B2
(45) Date of Patent: Mar. 27, 2012

(54) METHODS AND APPARATUS FOR GENERATING A DATA DICTIONARY

(75) Inventors: Yan Chen, Fremont, CA (US); Joe Anthony Beynon, Mountain View, CA (US); Baruch Perlov, Sunnyvale, CA (US); Sanjay Pundlkrao Ghatare, San Jose, CA (US); Alvaro Bolivar, San Francisco, CA (US); Nishith Parikh, San Jose, CA (US); Karin Mauge, Los Altos, CA (US); Guanglei Song, San Jose, CA (US)

(73) Assignee: eBay Inc., San Jose, CA (US)

( * ) Notice: Subject to any disclaimer, the term of this patent is extended or adjusted under 35 U.S.C. 154(b) by 354 days.

(21) Appl. No.: 12/347,938

(22) Filed: Dec. 31, 2008

(65) Prior Publication Data

US 2010/0169361 A1    Jul. 1, 2010

(51) Int. Cl.
*G06F 17/30* (2006.01)
*G06F 7/00* (2006.01)
(52) U.S. Cl. .................. 707/767; 707/770; 707/771
(58) Field of Classification Search .................. None
See application file for complete search history.

(56) References Cited

U.S. PATENT DOCUMENTS

| 6,845,354 | B1 * | 1/2005 | Kuo et al. ................. 704/9 |
| 6,978,275 | B2 * | 12/2005 | Castellanos et al. ......... 1/1 |
| 7,792,830 | B2 * | 9/2010 | Carmel et al. ........... 707/728 |
| 2002/0111879 | A1 * | 8/2002 | Melero et al. ........... 705/26 |
| 2007/0100875 | A1 * | 5/2007 | Chi et al. ............. 707/102 |

* cited by examiner

*Primary Examiner* — Tim T Vo
*Assistant Examiner* — Sangwoo Ahn
(74) *Attorney, Agent, or Firm* — Schwegman, Lundberg & Woessner, P.A.

(57) ABSTRACT

There is provided a method and system generate a data dictionary for searching data items stored in an information resource. In one embodiment, the system generates a list of synonyms for keywords entered in search queries to the system. A keyword and synonym form a token pair. Token pairs are evaluated according to a bidirectional divergence value calculated for distributions of search results, wherein the searches are based on the token pairs. Token pairs are then selected based on the divergence value. The selected token pairs are compiled into a data dictionary. In one embodiment, the data dictionary is a synonym dictionary used for user search query expansion to find matching items.

17 Claims, 16 Drawing Sheets

| PARAMETER | DATA |
|---|---|
| QUERY | 0 3 wide angle lens |
| FREQUENCY | 1 |
| OLD QUERY EXPANSION | AND ( 0,3,wide, angle, OR (lens,lense,lenses) |
| RESULT SIZE | 1 |
| EXECUTION TIME | 18560 |
| NEW QUERY EXPANSION | AND(0,3,OR(AND(wide,angle), wideangle), OR (lens,lense,lenses) |
| NEW RESULT SIZE | 2 |
| NEW EXECUTION TIME | 14801 |
| KL SCORE K1/K2 | -0.143841036246483 |
| KL SCORE K2/K1 | 0.19178804827624 |

*FIG. 14A*

| PARAMETER | DATA |
|---|---|
| QUERY | 007 james bond action man |
| FREQUENCY | 1 |
| OLD QUERY EXPANSION | AND ( 007,james,bond,action,OR(man,men)) |
| RESULT SIZE | 3 |
| EXECUTION TIME | 13248 |
| NEW QUERY EXPANSION | AND ( 007,james,bond,OR(AND(actionOR(man,men)),actionman)) |
| NEW RESULT SIZE | 3 |
| NEW EXECUTION TIME | 32922 |
| KL SCORE K1/K2 | 0 |
| KL SCORE K2/K1 | 0 |

FIG. 14B

| PARAMETER | DATA |
|---|---|
| QUERY | 1 compact flash |
| FREQUENCY | 2 |
| OLD QUERY EXPANSION | AND(1,compact,OR(flash,flashes)) |
| RESULT SIZE | 3 |
| EXECUTION TIME | 32398 |
| NEW QUERY EXPANSION | AND(1,OR(AND(compact,OR(flash,flashes)),compactflash )) |
| NEW RESULT SIZE | 53 |
| NEW EXECUTION TIME | 22772 |
| KL SCORE K1/K2 | -0.000416600743259297 |
| KL SCORE K2/K1 | 0.00100587083581704 |

FIG. 14C

METHODS AND APPARATUS FOR GENERATING A DATA DICTIONARY

TECHNICAL FIELD

An embodiment relates generally to the technical field of data communications and, in one example embodiment, to methods and systems to generate dictionaries to identify data items.

BACKGROUND

Databases and other information resources have the capability to store large amounts of data. Retrieval of data stored in an information resource requires a search mechanism. A common search mechanism employs a catalog containing information about the data stored in the information resource. Catalog information is intended to enhance the search mechanism for a given search query by providing similar or related data. The performance of the search mechanism is a function of the quality of the catalog information provided. When the catalog information is not closely related to the data stored in the information resource, a user query will result in either too few data items or unrelated, undesired data items.

BRIEF DESCRIPTION OF THE DRAWINGS

An embodiment is illustrated by way of example and not limitation in the Figures of the accompanying drawings, in which like references indicate similar elements and in which:

FIGS. 14A-14C illustrate examples of query entries and divergence calculations according to an example embodiment.

DETAILED DESCRIPTION

Figure 1:
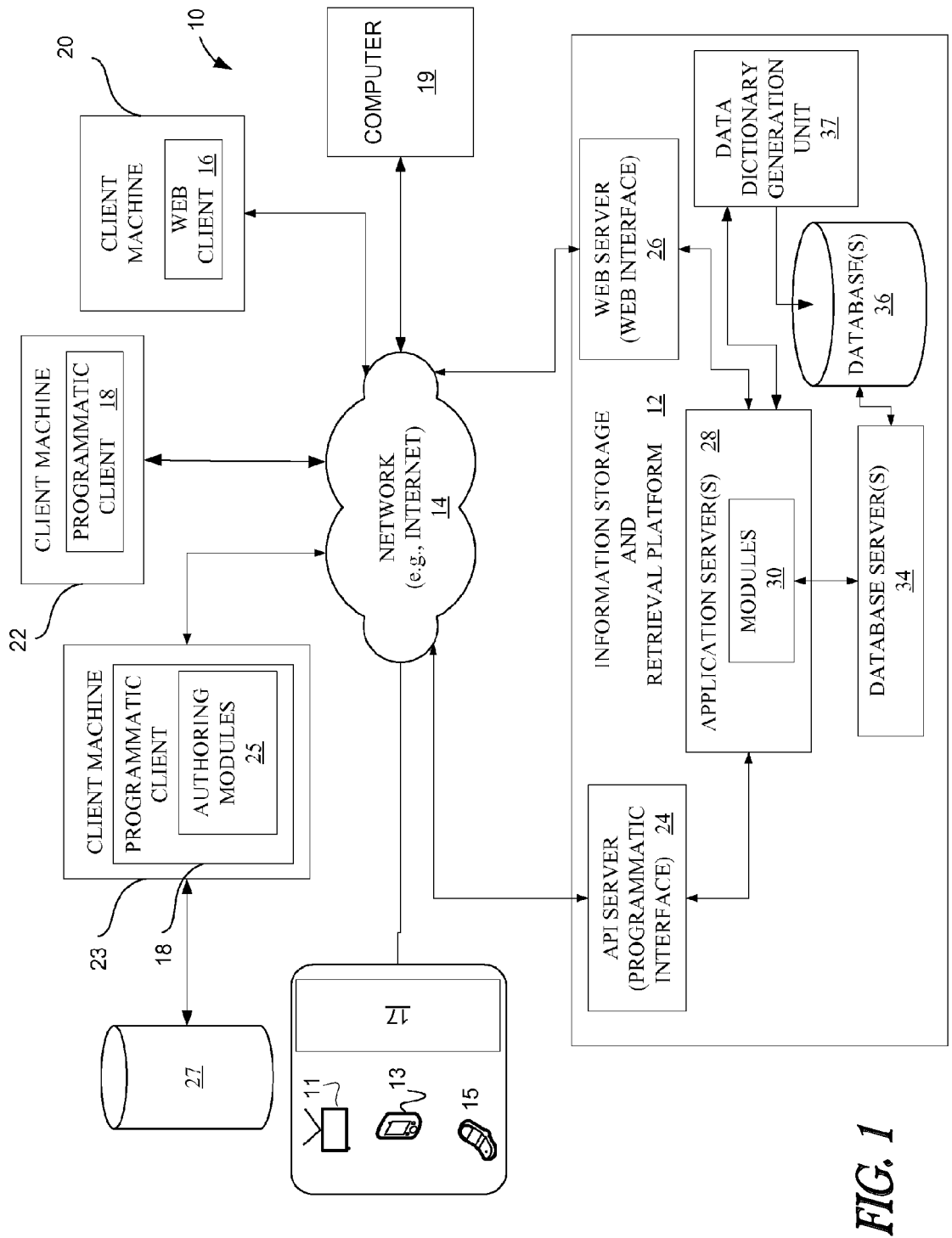
FIG. 1 is a network diagram depicting a system, according to an example embodiment, having a client-server architecture.

Methods and systems to enhance search capabilities in a network accessible information resource including generation of a data dictionary to identify data items stored in the information resource are described. In the following description, for purposes of explanation, numerous specific details are set forth in order to provide a thorough understanding of the present disclosure. It will be evident, however, to one skilled in the art that the subject matter of the present disclosure may be practiced without these specific details.

Designing a search mechanism for an information resource often involves creating a dictionary of related terms for each data item stored in the information resource. An information resource may be a database storing data, or a catalog of data where data items are grouped and identified according category. Data items stored in the information resource are organized to facilitate efficient retrieval of data items on a requested search. In one example, a database stores product information, where each data item corresponds to a product. A data dictionary aids in locating data items in the information resource, as a data dictionary provides words, terms and phrases similar to the desired data item. The data dictionary enhances performance of a search mechanism resulting in a more complete response to a simple search query, such as a search query from a user in a distributed network. Selection of words to build a vocabulary of a data dictionary is often a time-consuming manual process. Even when automated methods are used to build a data dictionary, the resultant vocabulary is evaluated manually. There is a need to improve the selection of words, terms and phrases to describe data items in a database.

In one example embodiment, a data dictionary vocabulary includes keywords and tokens, wherein each token is a synonym corresponding to a keyword. A token is a word, phrase, term, acronym, name or other expression which is expected to have a similar meaning to user entering search criteria into a search mechanism, or is expected to return similar search results as a corresponding keyword when each are entered separately into the search mechanism. Keywords are queries entered, or expected to be entered, by a user. Tokens are words synonymous with the keywords. Token selection is performed by first generating a candidate list of terms for the data dictionary; the candidate list is a compilation of information received from search queries. Where a keyword identifies products in a category, product descriptors in that category are used to form (keyword, token) pairs, referred to herein as token pairs. The keyword is considered a demand term, while the corresponding token is considered a supply term. The initial token pairs are evaluated to remove obvious inconsistencies, or those pairs that will result in search results outside a range desired by a user entering a given keyword. In addition to the initial token pairs, each keyword is evaluated to identify a synonym or synonyms, various rules are applied to capture variations of a keyword. The token pairs are then tested to determine those pairs which when used as search queries produce similar results. The test search queries may search on each word individually, as well as a logical relation between terms, such as a logical OR or AND. The results are evaluated with respect to other token pairs. In one example embodiment, statistical analysis is used to evaluate distributions of the token pairs.

One example embodiment of a distributed network implementing a search mechanism for data items stored in an information resource is illustrated in the network diagram of FIG. 1 depicting a system 10 having a client-server architecture. A commerce platform or commerce server, includes an information storage and retrieval platform 12, which provides server-side functionality, via a network 14 (e.g., the Internet) to one or more clients. As illustrated, system 10 interacts with a web client 16 executing on a client machine 20, a programmatic client 18 executing on the client machine 22, and, a programmatic client 18 in the form of authoring modules 25 executing on the client machine 23. Web client 16 in one embodiment is a web browser, but may be employ other types of web services.

Within information storage and retrieval platform 12, Application Program Interface (API) server 24 and web server 26 are coupled to, and provide programmatic and web interface to one or more application servers 28. Application servers 28 host one or more modules 30 (e.g., modules, applications, engines, etc.). Application servers 28 are, in turn, shown to be coupled to one or more database servers 34 that facilitate access to one or more databases 36. Modules 30 provide a number of information storage and retrieval functions and services to users accessing the information storage and retrieval platform 12. A user accesses information storage and retrieval platform 12 through Internet 14.

While system 10 of FIG. 1 employs a client-server architecture, the present disclosure is not limited to this architecture, and could be applied to a distributed, or peer-to-peer, architecture system. The various modules 30 and authoring modules 25 may also be implemented as stand-alone software programs, which do not necessarily have networking capabilities.

The web client 16 may access the various modules 30 via a web interface supported by web server 26. Similarly, programmatic client 18 accesses various services and functions provided by the modules 30 via the programmatic interface provided by the API server 24. In one example, programmatic client 18 is a seller application (e.g., the TurboLister® application developed by eBay Inc., of San Jose, Calif.) enabling sellers to author and manage data item listings, each listing corresponding to a product or products, on information storage and retrieval platform 12. Listings may be authored and modified when a client machine 20, 22, or 23 is not necessarily connected to information storage and retrieval platform 12, such as in an off-line manner. Client machines 20, 22 and 23 are further adapted to perform batch-mode communications between programmatic clients 18 and 25, and information storage and retrieval platform 12. In addition, programmatic client 18 and web client 16 may include authoring modules similar to authoring module 25 to author, generate, analyze, and publish categorization rules used in information storage and retrieval platform 12 to structure data items and transform queries. Transforming queries in one example embodiment uses a data dictionary with token pairs to expand a narrow keyword or to focus a broad keyword. The client machine 23 is further shown to be coupled to one or more databases 27. The databases 27 include information used by client machine 23 in implementing a service or operation, and may include specific information for products or services offered by client machine 23.

Users having access to service(s) provided by client machine 23, for example, include users of computer 19 and users of wireless network 17, which may serves as a common access point to Internet 14 for a variety of wireless devices, including among others a cable type television service 11, a Personal Digital Assistant (PDA) 13, and a cellular phone 15.

In one example, client machine 23 enables web services, wherein a catalog of web services is stored in information storage and retrieval platform 12. Client machine 23 stores information related to use the web services in databases 27, wherein the information is used to associate identify associated services and offerings. The associated services and offerings also listed in the catalog of web services. Descriptors of the associated services and offerings may be used to generate and modify a vocabulary for a data dictionary corresponding to the catalog of web services, such that a user search having keywords related to a first service may return results for a second service associated with the first service. Additionally, each of client machines 20, 22 and 23 may also be users that search data items in information storage and retrieval platform 12.

In another example, client machine 23 is an ecommerce client offering products to customers via Internet 14. Client machine 23 stores a catalog of products in information storage and retrieval platform 12; the catalog of products having a corresponding data dictionary. Client machine 23 stores information related to at least one product in databases 27. The information may include frequency of searches, resultant sales, related products, pricing information, and other information related to customer use of the ecommerce service. Additionally, databases 27 may store other product related information, such as style, color, format, etc. Client machine 23 may use the information stored in databases 27 to develop descriptor information for at least one product. Product descriptors and other product information may be used to generate and modify a vocabulary for a data dictionary corresponding to the catalog of products, such that a user search having keywords related to a first product may return results for a second product associated with the first service. In other embodiments, a client machine may store information in information and storage retrieval platform 12 related to business processes, or other applications which store data in a database which may be accessed by multiple users. A common problem in such systems is the ability to understand and anticipate multiple users' keywords entered in search queries as search terms. Each of multiple users may use different keywords to search for a same data item. The use of a data dictionary corresponding to data items enhances a search mechanism in returning the same data item to different users resulting from searches on different keywords.

To facilitate search within information storage and retrieval platform 12, data dictionary generation unit 37 generates information to store in a data dictionary. The data dictionary containing token pairs, wherein the token information may be based on information received from client machines 20, 22, and 23, such as product or service descriptor information, as well as other information related thereto. Dictionary generation unit 37 generates tokens, such as keyword synonyms, to aid in searching data items stored in databases 36. In one embodiment, token pairs generated by data dictionary generation unit 37 are stored in databases 36 with the data item information, e.g., product information. In an alternate embodiment, token pairs are stored in memory external to databases 38 and accessed on execution of a search of data items in databases 36. Data dictionary information may further be provided from data dictionary generation unit 37 or from databases 36 to databases 27 for inclusion in data used and maintained by the authoring modules 25.

The quality of a search mechanism (e.g., a search engine) to search an information resource is measured by the ability to return search results of interest to the user, i.e., search requester, in response to a search query. For example, a search mechanism may respond to a query from a user with search results that contain data items covering a spectrum wider than the interests of the user. The user may experiment by adding additional constraints (e.g., keywords, categories, etc.) to the query to narrow the number of data items in the search results; however, such experimentation may be time consuming and frustrate the user. To this end, data dictionaries are designed to enable search mechanisms to return search results of high relevance to the user.

Figure 2:
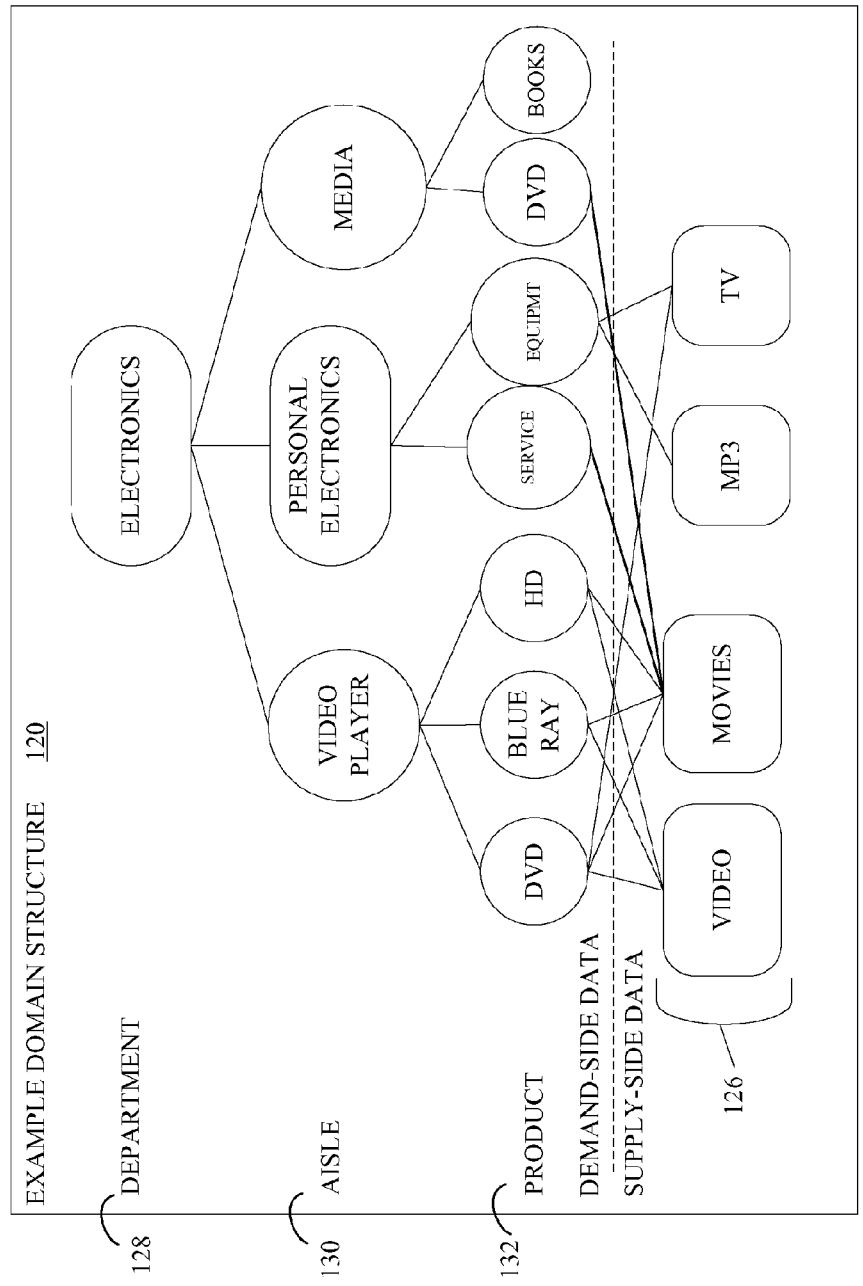
FIG. 2 is a diagram illustrating an example domain and category structure, according to an example embodiment.

In a typical search experience, the user enters a query including at least one keyword which is used to search an information resource, such as databases 36 of FIG. 1. The user chooses a keyword related to at least one data item, such as describing a product or service, stored in the information resource. As used within the catalog of data items, a domain is an organization of like data items and may include like data items or other like domain(s). Each domain corresponds to a category, wherein the catalog may be organized into a hierarchy of categories. The categories may be as illustrated in FIG. 2, which describes a catalog structure 120, according to one embodiment. The catalog structure 120 includes demand-side data corresponding to the organization of categories of data items as presented to a user. Demand-side data is shown to include product categories 132 including 'DVD,' 'Blue Ray,' 'HD' (representing High Definition products), 'service,' 'equipment,' 'DVD' (representing Digital Video Disc products, and 'books.' Product categories 132 illustrated in FIG. 2 are provided as an example, wherein product categories 132 may include any number of other categories. Product categories may be referred to as domains. Each of product categories 132 is included in at least one, and often multiple, aisle categories 130, which may be referred to as aisles. As illustrated, aisle categories 130 includes 'video player,' 'personal electronics,' and, 'media,' but may include any number of other categories. Each of aisle categories 130 is part of a department 128, which in this example is 'electronics'.

The catalog structure 120 also includes supply-side data. Supply-side data is shown to include categories 126 which may have been selected by an author (e.g., supplier or seller) of a data item, such as a data item stored in databases 36, or may have been selected by a catalog manager, responsible for composition, configuration and maintenance of information storage and retrieval platform 12. Categories 126 are used to categorize data items stored in databases 36 on information storage and retrieval platform 12, and thereby facilitate retrieval of data items in response to search queries. For example, an author may select one or more categories 126 to describe a data item. Categorization of a data item into categories 126, 132, 120 and within department 128 makes products visible for demand-side users. Categorization rules may be developed to determine where to place a data item; in other words, categorization rules provide guidance is selecting a category or categories for a data item. Categorization associates demand-side data to the supply-side data, specifically, categories 126 to categories 132 and 130, as well as to department 128. As illustrated, higher level categories include lower level categories, such as where departments 128. A high level category is referred to as a meta-category including lower level categories.

For a data item in an information resource, such as databases 36, corresponding catalog information includes the specific categories selected for categorization of the data item, as well as terms describing or related to the data item. For example, a data item may have a description displayed to users. The description contains descriptor information and terms which may be well suited for use as synonyms in a data dictionary, as these words provide specific information and may help in narrowing a search to a desired data item. Additionally, the frequency of a descriptor in describing a data item may provide further information as to the relevance of a term or terms in searching for that data item.

In one example, a data item may be a stamp, wherein the stamp is part of a stamp collection. The stamp supplier wants the data item to be retrieved when someone is searching for 'collecting,' 'stamp collecting,' 'collection' 'stamp collection' or 'stamp,' would specifically prefer to target users other than those entering simply 'stamp' as this search will result in retrieval of ink stamps, postage stamps, children's stamps, etc, and the supplier's data item may not be recognized. Therefore, the supplier will design the data item description using more specific terms frequently, and the more general terms less frequently.

Data item categories and descriptors provide information which will be used to retrieve the data item or product when input as keywords in a search query. In another example, a user in a distributed computing system enters search queries for data items, wherein the data items are stored in a database of a remote computer. The search queries are matched to descriptor information for data items in the remote database. By enhancing and expanding the search query, search results may be targeted more specifically to the desired data items, such as where a supplier has categorized an item in a category using terms different from those used by a user entering a search query. The computing system may be a distributed network, including a peer-to-peer system. The data items may be any type of information stored in a database(s), wherein data items are available for access on request. Requests are provided by search queries, which may be generated by a user, or a machine. In still another example, system 10 is a network-based publication system, receiving data items as contributions and providing the stored data items on request. In another example, system 10 includes an ecommerce service offering with products stored as data items in databases 36. A supplier, or seller, selects words, terms and phrases to describe products anticipating a user, or buyer, will use these words, terms and phrases as keywords in a search query to retrieve the corresponding data items in response.

Returning to FIG. 2, catalog information is further refined as a catalog manager selects terms and phrases related to each data item. The catalog manager may employ various selection rules in determining which terms to select for the catalog information, such as by tracking user activities to identify keywords, and combinations thereof, which have resulted in successful data item location. Here, success may be indicated by purchase of a product, or access to a web service or other further use of the retrieved data item by the user. Various selection rules may further consider synonyms of successful query keywords, data item category or categories, data item characteristics, similar data items, as well as similar or related categories, etc.

A catalog has a corresponding data dictionary, which may be referred to as a catalog of information. The data dictionary includes at least one entry for at least one data item in the product catalog. The entries in a data dictionary form a vocabulary. A data dictionary may be built using a variety of techniques, including stemming and transliteration, as well as other grammatical and lexicographical techniques. The following example is provided for clarity in describing techniques for building a data dictionary, and specifically describes an ecommerce system. The methods, apparatus and systems presented herein, however, are applicable to other search environments and examples, wherein a user enters search query keywords to identify data items stored in an information resource.

Referring again to system 10 of FIG. 1, included within application servers 28 are various modules 30, which may be specific to the function and service provided within system 10. One example of modules 30 is further detailed in FIG. 3 in block diagram form. The modules 30 include a communication module 40, which acts a communication agent for interactions, messaging and data transmissions between and among information storage and retrieval platform 12 and clients and users through Internet 14. Clients and users include client machines 20, 22 and 23, computer 10. and wireless network 17.

Listing module 74 receives information from a client for storage as a data item in databases 36. For example, a seller may operate a client machine 20 or 22 to enter information descriptive of a data item offered for sale or auction. Processing modules 46 receives categorization information and metadata for publication in a production environment or a preview environment. Processing modules 46 may publish to the production environment by publishing information to backend servers, such as servers 103 illustrated in FIG. 4, hosting query engine 52, search index engine 54, and categorization service engine 48. Processing modules 46 may publish to a preview environment by publishing information to a local backend server (not shown) hosting local versions of query engine 52, search index engine 54, and categorization service engine 48.

Processing modules 46 is further shown to include data item retrieval module 85 to receive data item requests from a category manager operating client machine 23. For example, responsive to receiving a request, data item retrieval module 85 reads data items from data item information stored on databases 36 and stores data items as sample information in the database 27.

Modules 30 further includes scrubber module 50 to receive item information, such as entered from client machine 22 or 20 to initiate creation of a new data item or modification of an existing data item. Scrubber module 50 may utilize services of categorization service engine 48 to structure information to be associated with the data item. Categorization service engine 48 provides rules for selecting categories.

A database utilized by string analyzer module 47 may include queries or data items entered by a user to information storage and retrieval platform 12. String analyzer module 47 analyzes strings of text to identify candidate values to associate with keywords. String analyzer module 47 receives requests from client machine 23 to identify candidate values to associate with a data item. A request may include descriptors, synonyms, or categories. In response to a request, string analyzer module 47 identifies strings of text in databases 36 that include at least a portion of the information included in the request. String analyzer module 47 relies on various services provided in information storage and retrieval platform 12 to identify and process strings of text. In one embodiment string analyzer module 47 identifies at least one boundary of a string of text based on a position of components contained in the string of text as well as derivatives thereof. For example, string analyzer module 47 may identify boundaries of a string of text based on a number of words to the left or right of a component in the string of text. In one embodiment, the number of words to identify is a configurable value. After a string of text has been identified, string analyzer module 47 may rely on a service available within or through information storage and retrieval platform 12 to remove certain words from the string or strings. For example, text strings may include 'stop' words which are words used so frequently in text that a typical full text search engine will skip during searching. These also include common words that add no significant help in a text search and may result in retrieval of excessive amounts of data items or records. Stop words include: the, a, and if, prepositions, etc. Stop words, used in isolation, are typically not considered as candidates for a data dictionary vocabulary, but may be included in a phrase which may be considered as a candidate. Next, string analyzer module 47 removes from the string any words, terms or phrases received in the request, as these are already assumed to be candidates in the current selection process for candidate token pairs. Finally, string analyzer module 47 returns the remaining words, terms and phrases as candidate token pair values to client machine 23.

Categorization service engine 48 applies categorization rules to data items to identify one or more category descriptors for association with the data item. Categorization service engine 48 applies categorization rules to data items, which may be referred to as listings, as new data items are added to information storage and retrieval platform 12, or responsive to publication of new rules.

Categorization service engine 48 processes data items received from client machines 20, 22. For example, scrubber module 50 may use services of categorization service engine 48 to apply categorization rules to a data item. The categorization service engine 48 may further store the data item, with the associated categorization information in databases 36 as item search information. Further, categorization service engine 48 pushes or publishes item search information, such as over a bus in real time to search index engine 54. Further, categorization service engine 48, may execute in a preview environment to enable analysis of newly authored rules before publication of the rules to a production environment. Further, the categorization service engine 48 may maintain histogram information in the form of data item counters as categorization rules are applied to data items. For example, categorization service engine 48 may increment a data item counter responsive to a condition in a clause of a categorization rule, when the condition evaluates TRUE. Histogram information may be communicated to client machine 20 to determine percentage coverage for most popular queries, categories, and data item information.

Modules 30 includes query engine 52 having categorization information 49, metadata service module 60, and metadata information 62. Metadata service module 60 may communicate metadata information to communication module 40 based on a received query from communication module 40, wherein metadata information may include metadata communication module 40 uses to format and generate an interface, such as a user interface. Search index engine 54 include search indexes 64 and data item search information 66, which may include data items and associated category and descriptor information. In a production environment, search index engine 54 receives transformed queries from communication module 40 and utilizes search indexes 64 to identify data items based on the transformed query. Further, in a production environment, search index engine 54 communicates located data items to communication module 40.

Publishing modules 42 provide information for viewing and use by users as well as suppliers. Each set of publishing modules 42 is associated with a classification service engine, such as search engine 48 of FIG. 4, a query engine 52, and a search index engine 54. Publishing modules 42 publishes new and existing rules to a production environment or a preview environment for information storage and retrieval platform 12.

In one embodiment, information storage and retrieval platform 12 embodies a network-based marketplace (e.g., eBay® online service provider, the Worlds Online Marketplace™ developed by eBay Inc., of San Jose, Calif.) supporting data item transactions, such as for goods or services, between suppliers and users. In one example, information storage and retrieval platform 12 receives information from sellers describe data items for sale, such information anticipated to be presented to potential buyers or bidders. In such an embodiment, modules 30 includes marketplace applications 44 to provide a number of marketplace functions and services to users accessing information storage and retrieval platform 12.

In a preview environment, a category manager is able to analyze rules and determine whether such rules perform as expected without impacting the production environment, or live operations. For example, a preview environment may enable a query analysis to determine popular queries, a category coverage analysis, a descriptor coverage analysis, or a token pair coverage analysis. After determining that rules perform as expected, a category manager may publish the rules to the production environment in information storage and retrieval platform 12.

Communication module 40 may receive a query from client machine 22 or 22 having one or more constraints (e.g., keywords, categories, information specific to a type of data item, or other item-specific information. Communication module 40 may interact with query engine 52 and search index engine 54 to process the query.

Figure 4:
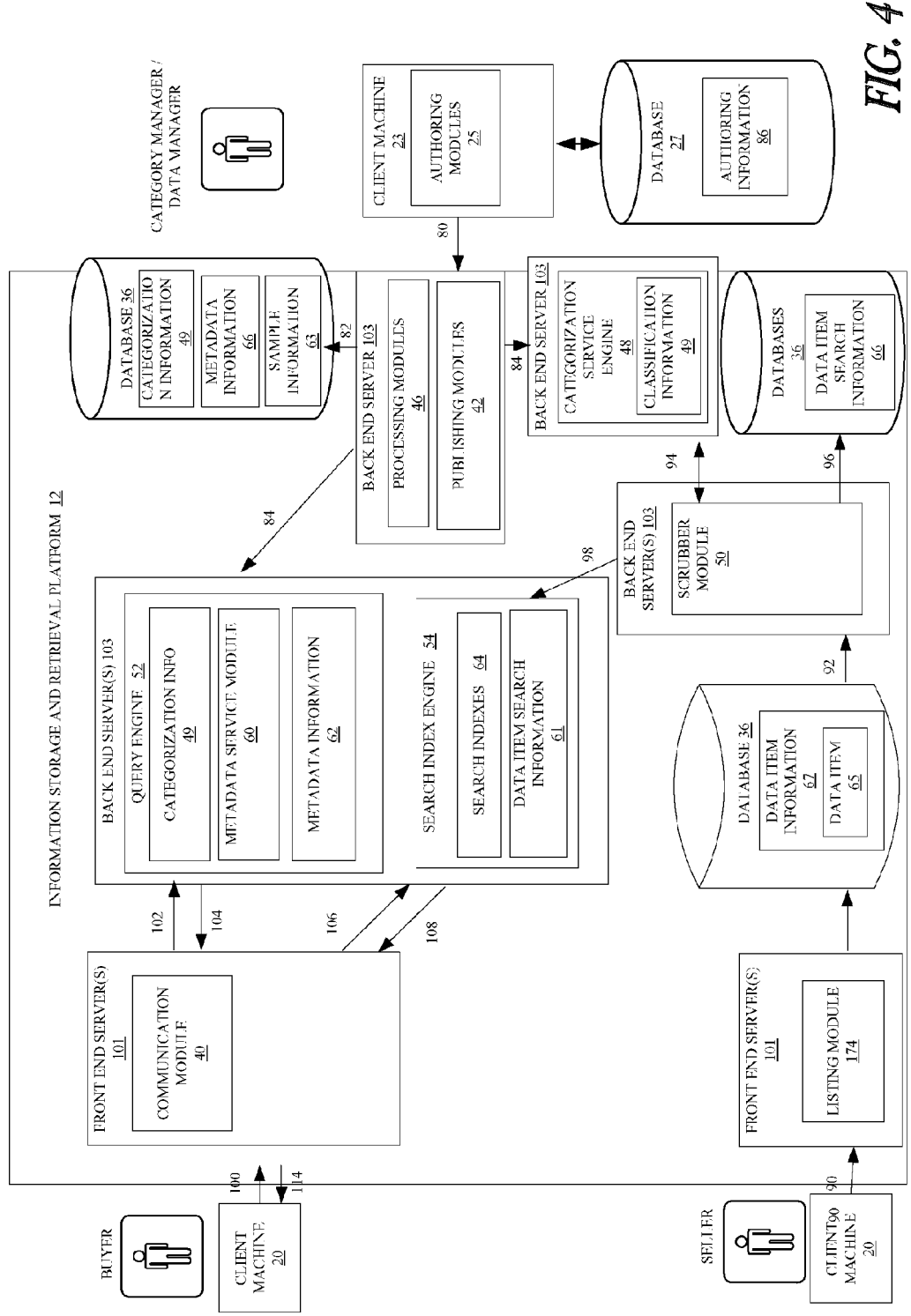
FIG. 4 is a block diagram illustrating an information storage and retrieval platform, according to an example embodiment.

FIG. 4 further details information storage and retrieval platform 12 in system 10 according to one embodiment. Authoring modules 25 are resident on or accessible by client machine 23 are adapted to generate candidate tokens, specific data item processing, specify categorization of data items, apply rules and edit function, define viewing specifics for data items presented to users, as well as other functions. In general, authoring modules 25 may be used to author, analyze and generate rules, including categorization rules. Specifically, authoring modules 25 generate candidate tokens and token pairs. Note, in one example, each token pair includes one keyword and one token, wherein the one keyword may be used to generate multiple token pairs.

Operations are illustrated in FIG. 4 for an example embodiment, wherein operation processing is identified by directional arrows between modules, indicating flow of information. Operation starts with operation 80, wherein client machine 23 publishes rules for use in a production and preview environment. A category manager, or other data manager, accesses authoring modules 25 to author the rules, which may include categorization and metadata rules. The authoring modules 25 provide the rules and information related thereto to back end server 103, which includes processing modules 46 and publishing modules 42, and which is included in information storage and retrieval platform 12. Operations 82 through 114 provide an overview of rule publication and operation in a production environment.

Operation 82 involves processing modules 46 store received rules in databases 36 in the form of categorization information 49 and metadata information 66. Processing modules 46 then provides the rules, such as by communication over a bus, to query engine 52 at operation 84. Query engine 52 includes metadata service module 60, metadata information 62, and categorization information 49. For example, A category manager may publish rules in real-time to facilitate addition of new rules or modification of existing rules while information storage and retrieval platform 12 is operating in production. In one embodiment, processing modules 46, query engine 52, metadata service module 60 and categorization information 49 communicate with each other over a bus using publish and subscribe middleware and database access software.

At operation 90, an author or publisher, such as for a supplier or seller, enters item information into client machine 20, which communicates the item information to information storage and retrieval platform 12 where the item information is stored as a data item in data item information 67 of databases 36. The data item is stored as data item 65. The item information entered by a user may include keywords for a title or description of the data item, as well as one or more categories in which to list data item 65. The item information may also include one or more item-specific information. For example, data item 65 may describe a pair of running shoes for auction or sale, and include terms such as running, jogging, sneaker, athletic, and other descriptors to be included in the title or description presented to potential users in describing the product. The item information in this example, may also include supplier-side category information, such as 'running shoes,' as well as demand-side category information, including product category, such as 'athletic shoes,' and aisle category, such as 'shoes,' and department, such as 'clothing, shoes and accessories.' Alternatively, the item information may include supplier-side category information, such as demand-side category information, including product category, such as 'running shoes,' and aisle category, such as 'athletic shoes,' and department, such as 'athletic goods.' Item information may further include descriptors, such as brand name, color, style type, and other item-specific information, such as for example 'water-proof.'

At operation 92, item information is provided to scrubber module 50 from databases 36. Scrubber module 50 reads the received data item and uses services provided by categorization service engine 48 (operation 94). The categorization service engine 48 structures the item information in the data item. For example, the categorization service engine 48 may structure the data item by applying categorization rules to the data item 65 as stored in databases 36. The categorization rules may include a condition and predicate clauses. The categorization service engine 48 applies a condition clause to a descriptor of the data item, such as to check for a word in the title, description, category, item-specific information, etc. of the data item, and if the condition evaluates TRUE, then a corresponding predicate clause suggests a word, term or phrase as a candidate token be associated with data item 65 in a token pair.

At operation 96, scrubber module 50 stores the data item and candidate token pairs as data item search information 66 in databases 36. At operation 98, back end servers 103, and scrubber module 50 in particular, pushes or publishes information from data item search information 66 to search index engine 54 to store the information and update search indexes 64 based thereon. For example, search index engine 54 may add a data item identification number to appropriate search indexes 64 which is associated with keyword(s) or token pairs of data item 65.

At operation 100, a user may enter a query including different types of constraints, including a keyword constraint, an item-specific constraint, and a category constraint. The query may be received by communication module 40 at information storage and retrieval platform 12. At operation 102, communication module 40 communicates the query to query engine 52, at back end server 103.

At operation 104, query engine 52 provides token pairs and metadata information to communication module 40. Communication module 40 uses the received information to construct a transformed query. For example, the transformed query may include keywords from the query and token pairs extracted from the query. In addition, communication module 40 caches the metadata for subsequent use in developing and presenting a user interface.

At operation 106, communication module 40 communicates the transformed query to search index engine 54 at back end server 103. Search index engine 54 uses the transformed query to locate and retrieve data item 65. Search index engine 54 retrieves data item 65 using search indexes 64. For example, search index engine 54 uses the keywords constraints (e.g., keywords) in the transformed query to retrieve item identification numbers from search indexes 64 corresponding to the keywords. Further, search index engine 54 uses the token pairs in the transformed query to retrieve item identification numbers from search indexes 64 corresponding to the token pairs.

At operation 108, search index engine 54 communicates the retrieved data items to communication module 40 which, in turn, uses the data items and metadata information from metadata information 62 to generate and populate a user interface. At operation 114, communication module 40 communicates the user interface information to client machine 20 for displaying the user interface to the user. These operations act on requests received for data items, wherein data items are identified by token pairs stored as vocabulary in a data dictionary. The following examples detail generation of token pairs, vocabulary and data dictionaries for use in a system storing data items in a database for later search and retrieval.

Various techniques employed in building a data dictionary, and specifically in selecting the words, terms, phrases, symbols and relationships among the data entries, typically begin by generating a list of candidate pairs, each candidate pair including a keyword and a 'token,' the token being similar or related to the keyword. The keywords are obtained from search query inputs; the tokens are generated by application of at least one token generation rule to a keyword.

Figure 5A:
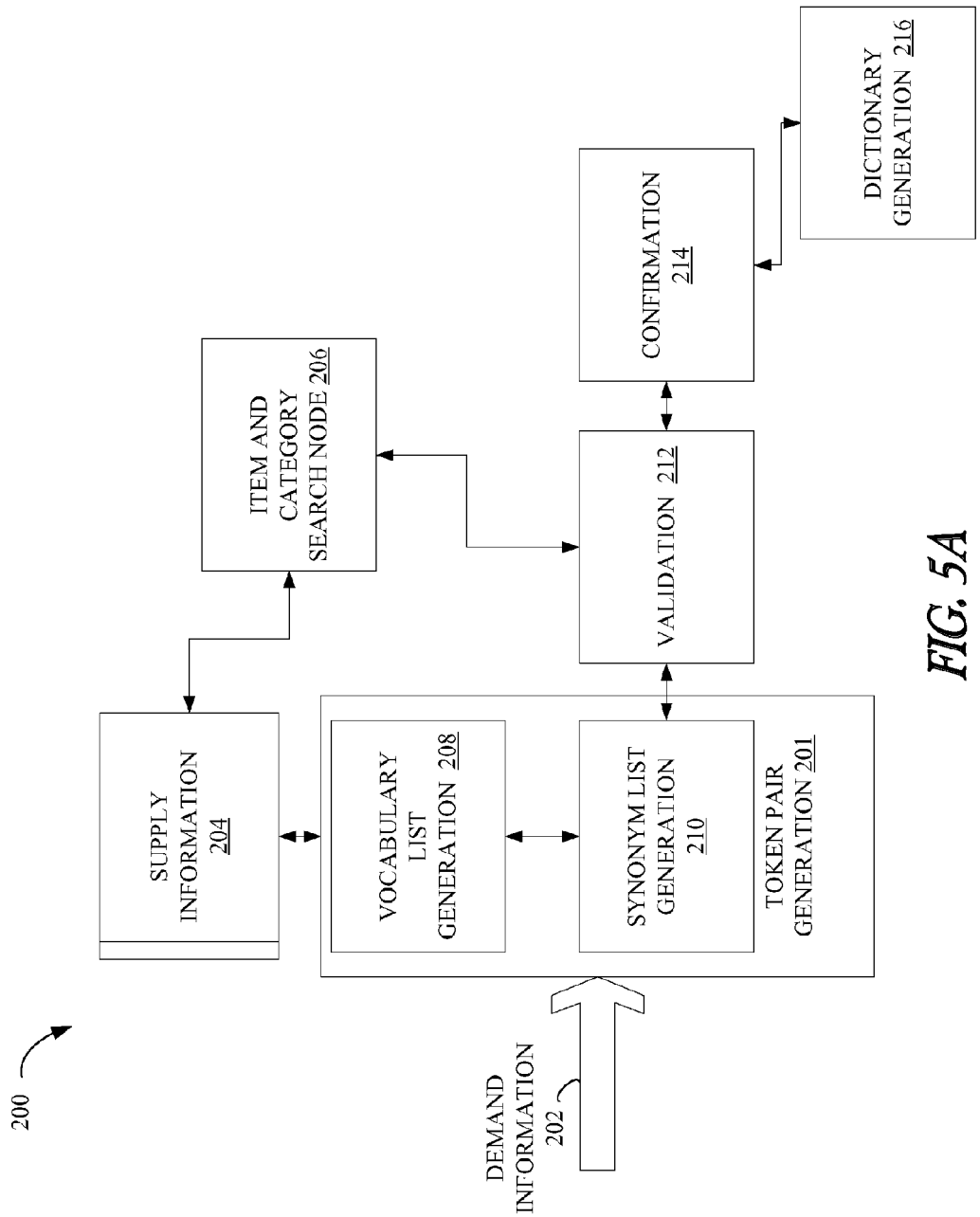
FIG. 5A is a diagram illustrating data dictionary generation, according to an example embodiment.

FIG. 5A illustrates a workflow for generating a data dictionary according to an example embodiment. Demand information 202 is received from search query inputs for data items in a database. The demand information may be requests from a buyer seeking products stored in a database of an ecommerce network. The supply information 204 is provided as information describing the data items stored in the database. For example, the supply information may be provided by sellers in placing product data items for sale in and ecommerce network. The demand information 202 and supply information 204 is provided to token pair generation unit 201, including vocabulary list generation module 208 to generate a list of candidate keywords to populate a data dictionary corresponding to the database, and synonym list generation unit 210 to generate token pairs to build a vocabulary in a data dictionary 216.

Vocabulary list generation module 208 provides a candidate list of keywords to synonym list generation module 210 to generate synonyms for the keywords. Vocabulary list generation 208 receives keywords in search queries of demand information 202. Vocabulary list generation 208 applies vocabulary generation rules to the keywords. In some cases, the vocabulary generation rules eliminate words, such as misspelled words, and in other cases, the vocabulary generation rules expand to additional keywords, such as in addition of known variations. The keywords are processed to remove certain entries, such as stop words, described hereinabove, and misspelled words. The resultant list of keywords is provided to synonym list generation 210.

The synonym list generation 210 creates a list of token pairs, where a keyword is associated with at least one, and possibly multiple, synonyms, referred to as tokens. The vocabulary list generation module 208 outputs resultant list of keywords, and in response synonym list generator matches the received keywords from demand information 202 with related words found in supply information 204, which includes category and descriptor information. Various techniques are applied to map demand keywords with supply words, terms and phrases, such as running the demand keywords through a search mechanism and finding resulting data items. The descriptors, category information, title, description and other catalog information may then be selected as synonyms or tokens. Additional techniques are applied to generate common variations of keywords, such as plurals and gerund forms, as well as variant spacing. The synonym list generation 210 forms token pairs by combining a keyword with each synonym. In one embodiment, a keyword has a set of synonyms, wherein synonym list generation 210 provides multiple tokens for the keyword.

The token pairs are provided to validation module 212 to apply validation rules to the token pairs. Validation results are entered into the item and category search node 206 to check performance of the various token pairs against the actual data stored in the database. Within a group of token pairs, some will perform similarly to other pairs, while some are outliers and provide significantly different results. The validation may involve a divergence calculation of the token pairs, wherein divergence values exceeding a threshold are discarded. The result is a set of validated token pairs, or validated token pairs, which are provided to confirmation module 214.

The confirmation module 214 applies confirmation rules to confirm the validated token pairs will result in an enhanced search experience for the user, e.g. buyer. In one embodiment, confirmation 214 calculates an information radius, wherein information radius values exceeding a threshold are not included in the data dictionary. In an alternate embodiment, validation 21 performs the information radius calculations, and confirmation module 214 applies other confirmation rules, such may include running additional searches through item and category search node 206. Finally, the system 200 includes a dictionary generation module 216 which compiles the confirmed token pairs and generates a data dictionary.

Figure 5B:
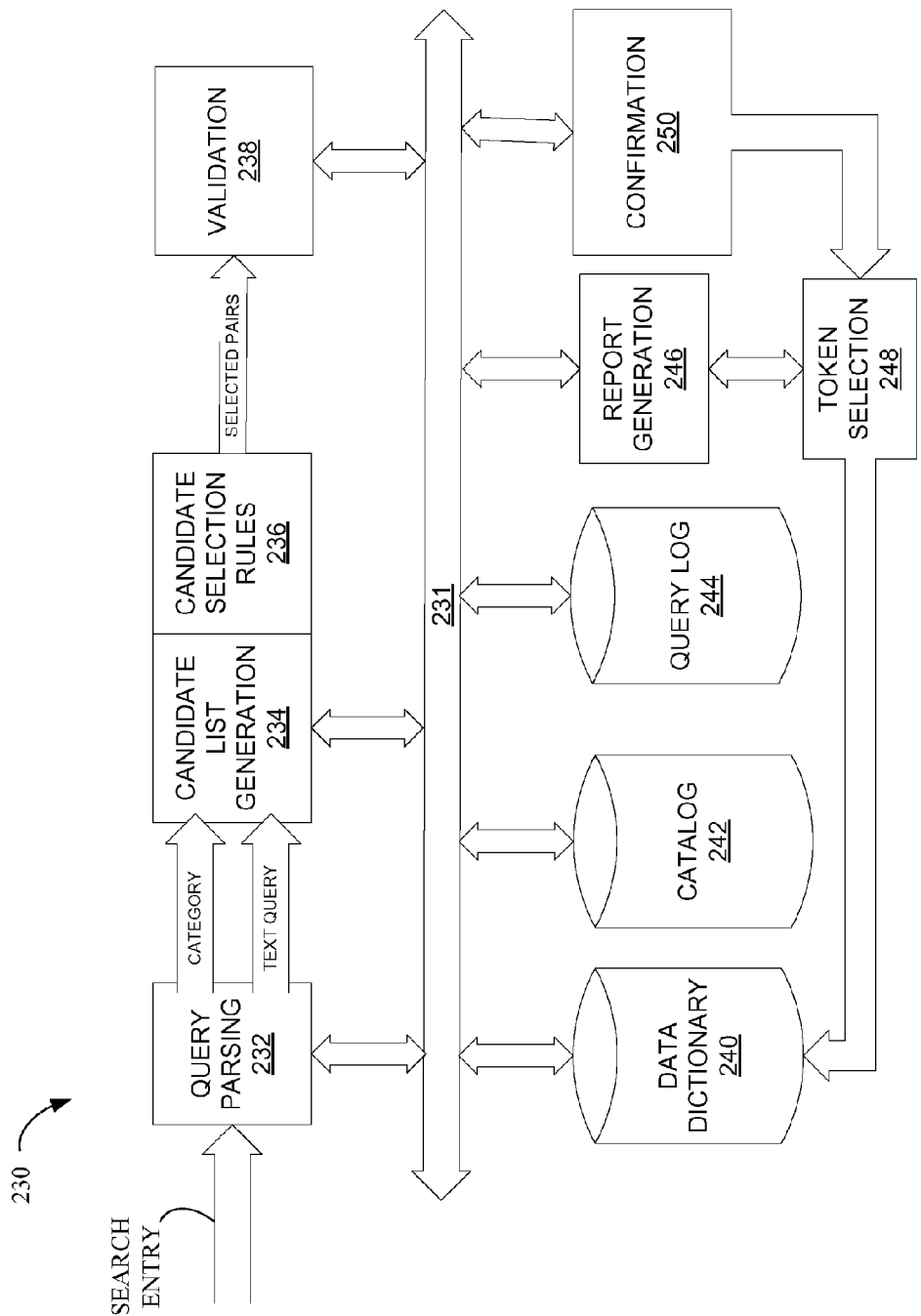
FIG. 5B is a diagram illustrating a system for generating a data dictionary according to a process as in FIG. 5A, according to an example embodiment.

FIG. 5B illustrates a computer system 230 facilitating generation of data dictionary 240 according to workflow 200 of FIG. 5A. The system 230 includes query parsing unit 232 for receiving search queries and identifying keywords to use in generating a vocabulary in data dictionary 240. Data dictionary 240 may include multiple vocabularies associated with different processes, searches, or catalogs. Query parsing unit 232 also receives information from catalog 242 and query logs 244, each of which, in one embodiment, includes memory storage units and local processing units (not shown). Query parsing unit 232 provides category and text query information, including keywords, as a candidate list to candidate list generation unit 234, which applies candidate selection rules 236 to the candidate list and generates token pairs, including at least one synonym, or token, for each keyword. The token pairs may be preprocessed to avoid undesirable results in search, such as where a token pair is too broad and would result in excessive data items in the search result.

Figure 9:
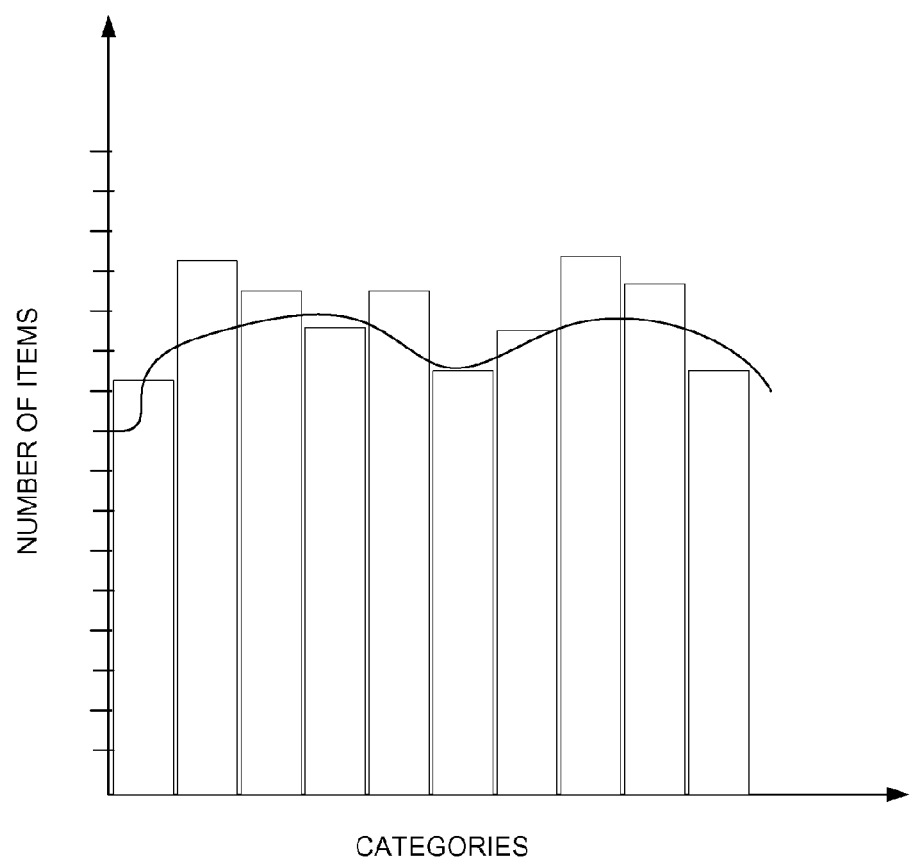
FIG. 9 illustrates a histogram representing divergence calculations for a token generated by a process as in FIG. 8, according to an example embodiment.

The token pairs are then provided to validation unit 238 to evaluate relationships among expected results for token pairs. Validation unit 238 initiates a search for each token pair. The results identify the number of data items retrieved over multiple categories for searches using each token pair. The results may be illustrated in histogram form, such as illustrated in FIG. 9, which provides in graphical terms the analysis performed in validation unit 238. The resultant search information is evaluated under information theory techniques to identify trends and remove outliers, as these may result in excessive retrieval of data items or may not enhance search results. In one embodiment, validation unit 328 measures divergence of the resultant search information, wherein a divergence measure is evaluated against a threshold to determine which token pairs are validated, and which will token pairs will not be used in data dictionary 240.

Results of the validation processing by validation unit 238 are provided to confirmation unit 250 to evaluate relationship among entries in each token pair. The confirmed token pairs are provided to token selection unit 248 to determine if further processing is required, such as to repeat any of the rules applied in generating the confirmed list of token pairs. Further, a report generation unit is provided to receive the final output of token selection unit 248, and to provide a report for evaluation of the token pairs as well as evaluation of parameters calculated during generation of data dictionary 240.

The various units of system 230 communicate with each other through a communication bus 231. The system 230 further includes catalog 242 and the associated data dictionary 240. Catalog 242 stores product information in a database of data items. Data dictionary 240 serves to enhance searches for data items of catalog 242. A query log 244 is maintained to track search query inputs to the system. The query log 244 may provide historical information on searches, success rates of token pairs, as well as usage statistics.

Figure 6:
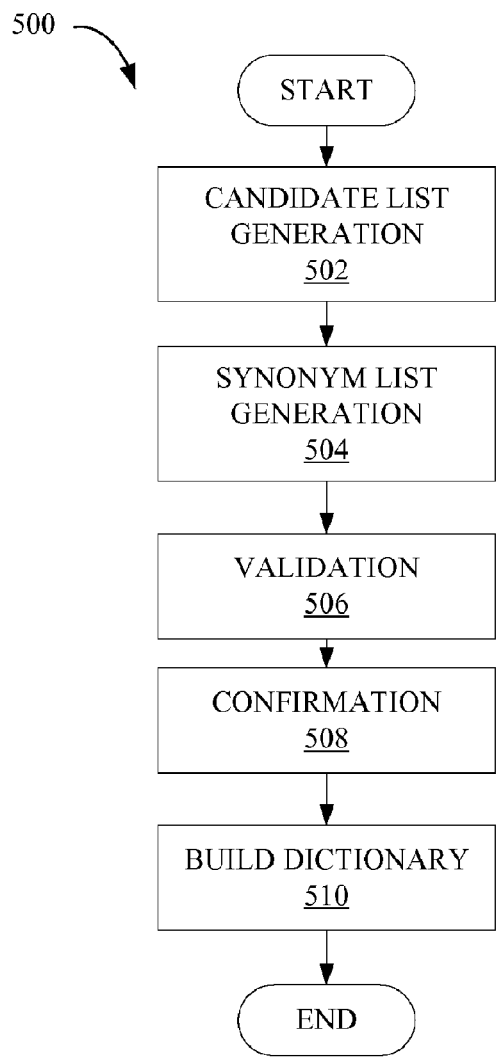
FIG. 6 illustrates a flow diagram of the processing for data dictionary generation as in FIGS. 5A and 5B, according to an example embodiment.

FIG. 6 illustrates an example embodiment for generating a data dictionary starting with candidate selection based on query entries, or demand data. The process 500 begins by generating a candidate list, 502, based on search request keywords and categorization and description of data items stored in the information resource. The candidate list is an initial vocabulary list. In an ecommerce example, the search request keywords may be entered by a potential buyer seeking a product or service offered by the ecommerce system; while the categorization and description of data items refers to information input by the seller, or the ecommerce service, in identifying the product or service. The search request keywords are considered demand data or demand information, while the categorization and description of data items is considered supply data or supply information. Process 500 then generates a synonym list, 504, to identify other words, terms and phrases similar to keywords in the vocabulary list. The process 500 validates the synonym list, 506, such as by evaluating a divergence of candidates from the original query entries or keywords, and confirms validation, 508. The resultant confirmed list of token pairs is used to build a data dictionary, 510.

In one example embodiment, the data dictionary is a stemming and transliteration type dictionary including terms which result from stemming the original tokens and application of transliteration techniques to expand a list of candidate tokens. Stemming refers to a process of reducing a keyword to its root form, or stem, and then capturing all related words having the same stem.

Figure 7:
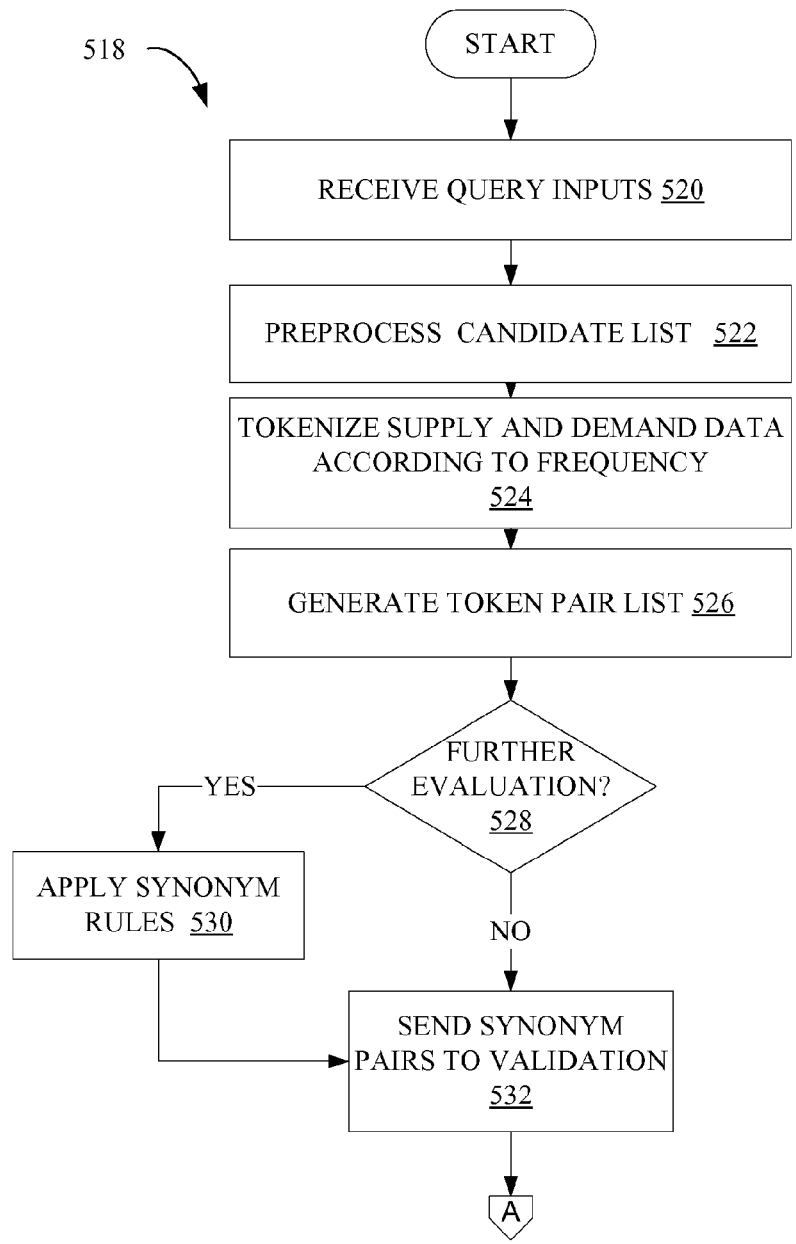
FIG. 7 illustrates a flow diagram of the processing for candidate list generation as in FIG. 6, according to an example embodiment.

FIG. 7 details a process 518 for selecting candidate token pairs, which starts by receiving a query input, 520, made up of at least one keyword. The candidate list of keywords is preprocessed to refine the list to those keywords which have significance in a search. For example, stop words are removed, misspelled words are removed, unrecognizable combinations of characters are removed, etc. Various rules may be applied to filter the list of candidate keywords, 522. These rules identify words for elimination from the set of received keywords in query inputs. The result is a list of keywords for use in a data dictionary.

The list of keywords is then tokenized, 524, wherein tokens are identified for each keyword in the list of keywords, and combined with the corresponding keyword to form a token pair. The process 518 identifies synonyms to enhance search for a given keyword. Synonyms include words, terms and phrases, which when used as keywords in search queries will return similar sets of data items or more specifically focus a search for a data item. For example, the keyword 'shoe' may have a synonym 'shoes' which will result in similar and sometimes overlapping results when entered into a search of the information resource. Synonyms are found by expansion of keywords according to various linguistic rules, as well as by evaluation of supply information to identify a location and frequency of terms as used to identify data items. In one example, a frequency threshold for supply (item titles data) and demand (user queries) was set at minimum 50 occurrences from one month of items and query information for activity in the United States. The dictionaries are then built for each country or location based on the information gathered for that country, i.e. from item listings in the country and queries in that country). The synonyms identified as candidate tokens are evaluated with respect to their distance from the original keywords. In one embodiment, synonyms formed by modifying a keyword with respect to a specific number of character additions or deletions are filtered out as synonyms.

As used in one example embodiment, data dictionary entries making up a vocabulary are generated for an ecommerce site. A vocabulary entry is a combination of keyword and corresponding token. Buyers accessing the ecommerce network enter search queries, referred to herein as demand information, to retrieve product data the information resource. Sellers accessing the ecommerce network enter product information, including category and textual description information, referred to as supply information, for products in the information resource. The vocabulary list is generated by first collecting demand information, such as information gleaned from query logs maintained for query entries. The data is compiled over a predetermined time period, such as over a month.

As illustrated in FIG. 7, the process begins by receiving query inputs, 520, such as demands from a buyer in an ecommerce system. The query inputs include keywords, which are entered as part of the search query. The keywords are compiled into a candidate keyword list, including all related keywords. Preprocessing of the candidate keyword list is done at step 522 to remove invalid entries, such as special characters or ones that would not be helpful as search terms.

The resultant list of keywords is then tokenized, 524, by comparison of data item descriptors to keywords. Token generation rules are applied to keywords to develop candidate tokens and candidate token pairs. The token is a candidate for entry in the data dictionary, or the vocabulary with and for the original keyword from the keyword list. Tokenization involves processing the list of keywords and outputting candidate token pairs having a keyword and at least one token. The token generation rules often include preprocessing to remove special characters in candidate tokens and invalid tokens. This results in a list of candidate tokens for each keyword, wherein each pair of keyword to token is a candidate token pair.

In one embodiment, process 518 tokenizes supply and demand data into tokens according to frequency of use in supply and demand data. In this process candidate tokens are compared to supply information to identify those tokens which are used less frequently by sellers in categorizing and describing their products. Data item descriptors as well as categorization information may be provided by a seller to describe products and services offered for sale, and by a category manager who authors further information, which may include categorization or general description for the product. Those tokens used most frequently are expected to be more consistent with the products corresponding to the search queries of buyers. A frequency threshold may be applied to determine those tokens of sufficient frequency to be selected for entry in the vocabulary list of the data dictionary. In one example, a threshold may be used to evaluate candidate tokens against supply information, and another threshold used to compare candidate tokens against demand information. The frequency of a token in the seller information is a measure of how often the token is used in the product information, including product title, product category, product description, or other information which may be used in identifying the product in response to a search query. The frequency of a token in the demand information is a measure of how often the token is entered as a search query or as part of a search query. At this point, the candidate tokens found to have sufficient frequency in the search information or sufficient frequency in the demand information are merged into one list.

Token generation rules are applied to the list of keywords to generate additional tokens for each of the keywords. As used herein, and in the examples provided, a synonym corresponds to a set of query keywords that will return sets of similar data items. The synonyms anticipate common variations or similar words that may be used either by the buyer entering a search query or the seller in describing the product. These token generation rules may be considered synonym generation rules. The result of applying token generation rules to a list of candidate keywords is to expand the list of candidate tokens. Common token generation rules, or synonym rules, include singular to plural expansion, unit of measure keyword expansion, terms, accented character expansion, and others. For a singular to plural expansion, a rule may be implemented to turn 'puppy' into 'puppies' and thus the token candidate pair is (puppy, puppies). For unit of measure keyword expansion, application of token generation rules evaluate letter and number combinations, such as when a letter follows a number to identify a unit of measure. In this case, a search query keyword of '10 lb' would be found to correspond to '10 lb' and thus the token candidate pair (10 lb, 10 lb). Still further, for foreign language words in particular, a rule identifies accents as used on specific characters. For example, for a keyword 'nüvi' token generation rules would suggest 'nuvi' as a token candidate, and thus the candidate token pair (nüvi, nuvi).

Other token generation rules may be applied in addition to anticipate synonyms of keywords. The various token generation rules may be applied sequentially, and recursively. Different applications may use a first set of token generation rules, while another application may use a different set of token generation rules, or a different combination of the first set. For example where a search query entry of '10 lb' is considered synonymous with '10 lb' according to the unit of measure rule, and wherein '10 lb' is further synonymous with '10 lbs' according to the singular and plural rules. Note, the query entry '10 lb' is also synonymous with '10 lbs.' In this case, the token generation rules are applied recursively resulting in the keyword '10 lb' having multiple synonyms forming a token group, specifically, (10 lb: 10 lb, 10 lbs, 10 lbs).

In one embodiment, token generation rules provide an output in a tabular format, where each token pair or token group is listed in a row or line of a table. Each row corresponds to a keyword that will form a vocabulary. A sample vocabulary is given as: puppy, kitty, puppies, 10 lb, 10 lb, 10 lbs, and a corresponding candidate token pair list is given as:

| 1. puppy | puppies | | | |
|---|---|---|---|---|
| 2. 10lb | 10 lb | 10 lb | 10lbs | 10 lbs |

Application of synonym rules may apply specific criteria or threshold to identify synonym candidates. In another example, for keyword 'DVD,' a possible token is 'DVDs,' which is formed by a single addition of the letter 's' to the keyword 'DVD.' The token generation rule specifies the number and type of alterations allowed to the keyword to generate tokens so as to generate tokens within a specified distance of the keyword. In this case, for a specified distance of 3, and therefore, 'DVDs' is included in a candidate token group. In contrast, the synonym 'Digital Video Disc' would be excluded under a distance rule, but may be included under another rule.

In this example, consider a search for a product entitled 'The A Movie' which is a DVD product. In building a data dictionary as related to the movie product, the term 'DVD' is received as a keyword. As some search mechanisms distinguish a search query for 'DVD' from a search query for 'DVDs,' the catalog manager built the data dictionary to include the token 'DVDs'. Without entering 'DVDs' in the data dictionary, a search mechanism may not search for a 'DVD' in response to a user search query of 'DVD'. To avoid this situation, and to anticipate the variety of entries a user may enter into a search query, 'DVDs' is a token forming a token pair with 'DVD.' The user searching for the movie may not find the 'DVD' version. In other words, identification and inclusion of tokens in a data dictionary avoids incomplete search results.

Continuing with FIG. 7, after completion of the initial candidate token list it is determined if further evaluation may be desired, 528. If yes, the process applies additional token generation rules or reapplies previously used token generation rules, 530. A decision to add further rules may be based on information determined from the query inputs, 520, during preprocessing the candidate list, 522, during tokenization, 524, or as a result of generating the candidate token list, 526.

Additional rules may respond to more complex or advanced searches, including use of logical expressions in a search query. For a simple case, a user may enter a search query for 'DVD OR movies.' In this case, the alternatives are provided as tokens. Other techniques employ language-based or grammatically related terms, such as semantic relations. In one example, the term 'New York' is used as a token, even though the individual terms, New and York, would both be possible tokens. Once a candidate token list is prepared, the process 518 provides the token pairs (or groups) for validation processing, 532.

Figure 8:
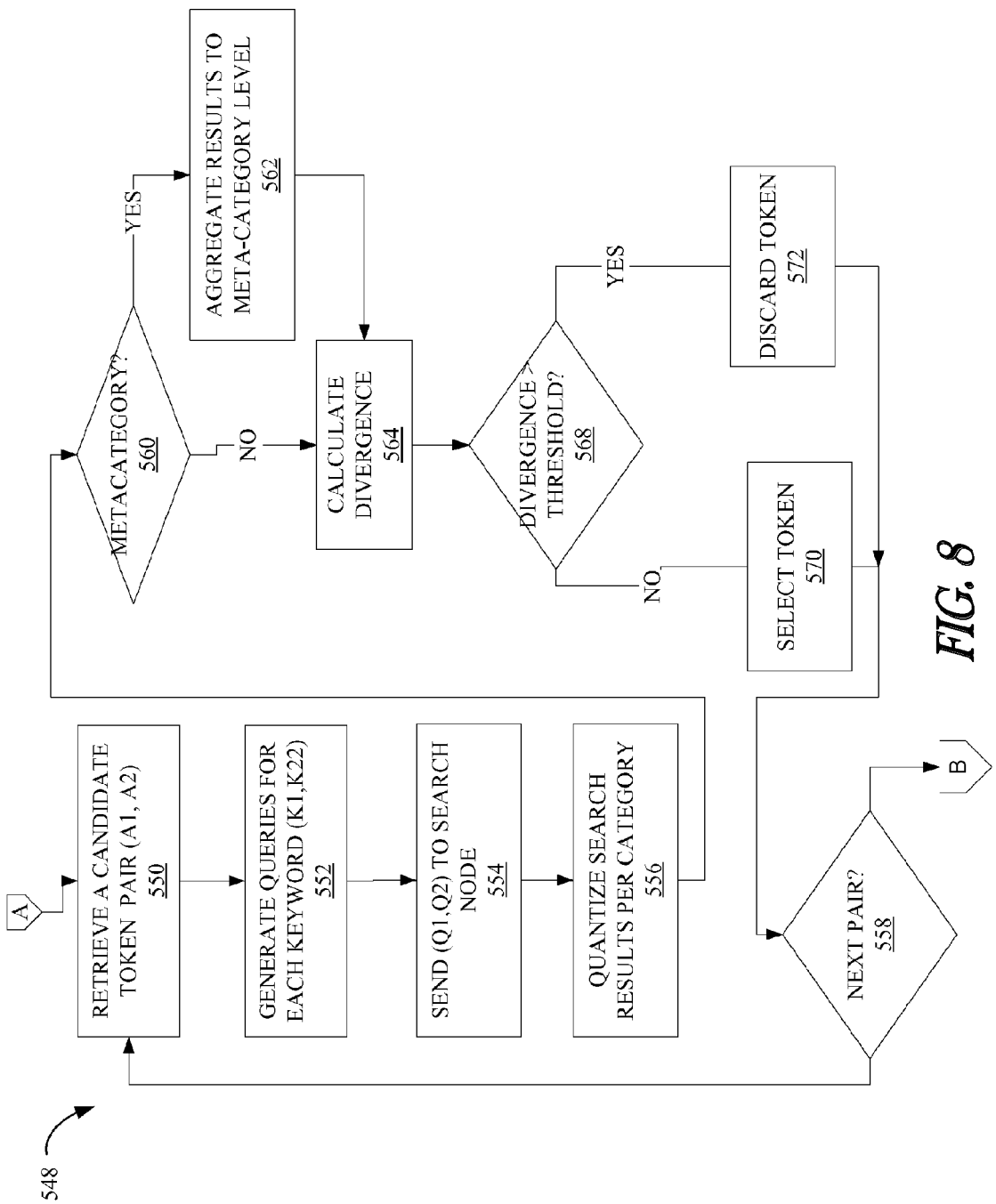
FIG. 8 illustrates a flow diagram of the processing for generating tokens for use in a data dictionary as in FIG. 6, according to an example embodiment.

FIG. 8 illustrates one example embodiment for validation of a candidate token list. Validation verifies that the tokens on the list will have the desired result. For each candidate token pair the token and keyword are used as search criteria for locating data items in the information resource, or in this case product database. The composition of the database used for the search may be based on data stored over a fixed period of time, such as a fifteen (15) day interval over which supply data is compiled.

A validation process 548 illustrated in FIG. 8, retrieves a candidate token pair identifying A1 as the keyword and A2 as the token, 550. Process 548 searches using the pair (A1,A2)

and analyzes results for divergence. This process helps identify similar token pairs which satisfy divergence criteria. In one embodiment, Kullback-Leibler (KL) divergence is analyzed, wherein KL divergence is calculated by using a category item count for each token pair. Calculation of KL divergence considers distributions P and Q of a discrete random variable, and is defined as KL divergence, D, of Q from P:

$$D(P\|Q)=\Sigma P(i)\log(P(i)/Q(i)). \quad (1)$$

In the present discussion, P and Q represent distributions of search results for a given token pair, i.e., keyword and token. The variable i represents the number of categories, sometimes referred to as domains, of the search results. In this example, Equ. (1) is evaluated over i=1, 2, ... N, wherein N is the total number of categories. The distributions P and Q may be considered probability distributions as the database of items is dynamic with entries being added and deleted and therefore, P and Q each provides a measure of the probability of future distributions. P(i) is the number of items matching query K1 in category (i) and may be normalized when divided by the total number of items in category (i). Q(i) is the number of items matching query K2 in category (i) and may be normalized when divided by the total number of items in category (i).

In one example, a process generates queries for keyword and token in the token pair (A1, A2) labeled, K1 and K2, respectively, 552. K1 is a query using the keyword A1, while K2 is a query using the token A2. The queries are sent to a search node, 554, such as to item and category search node 206 is illustrated in the work flow 200 of FIG. 5A or query engine 52 as in FIG. 4. The query search results are identified as R1 and R2, respectively. The search results are available for analysis, such as evaluation of R1 and R2 individually, or in combination, or in a logical combination, such as R3=(R1 OR R2) or as R4=(R1 AND R2), etc.

The category quantities are used for statistical analysis as well to determine the KL divergence, and compare distributions of the results. Consider a histogram corresponding to quantization of search results by category, such as illustrated in FIG. 9, where the horizontal axis represents the categories and the vertical axis represents the number of items retrieved in the category. The illustrated histogram has a smooth distribution, which indicates the term is noisy as it does not have any dominant category. The KL divergence indicates a level of consistency in search results, and therefore low values of the KL divergence are validated for entry into a vocabulary for the data dictionary, whereas a high KL value is an indication of uncertainty and results in no validation for those token pairs.

In analyzing results, lower level categories, such as product categories 132 and aisle categories 130 of FIG. 2, are aggregated into higher level categories, or meta-categories, such as department 128, 560. Process 548 calculates KL divergence for each of the token pairs, 564.

In this example, the divergence score is a KL value, however, other statistical analysis methods may result in other values indicating the predictability of results. Token pairs having a score greater than a divergence threshold, 568, such as in one example 1.0, are removed, 572. While token pairs having a score less than the divergence threshold are selected as entries in the vocabulary of the data dictionary, 570. The process continues to identify any other token pairs, 558. When all token pairs are validated, indicating the validation procedure, 506, as in FIG. 6 is complete, the process 548 continues to confirmation, 508.

In the present discussion, P and Q represent distributions of search results for a given token pair, i.e., keyword and token. The variable i represents the number of categories, sometimes referred to as domains, of the search results. In this way, the KL divergence measures the difference between results of searches for the keyword and token. In other words, when both keyword and token result in similar numbers of items retrieved for the same categories, the distributions over those categories are the same. The distributions are determined by first performing a search on the keyword and the corresponding token, such as performing a search for the keyword 'Nike' and the token 'Nikes.' One search is performed using the keyword 'Nike' which results in the following matching items retrieved by category:

TABLE 1

Search Results for Keyword 'Nike' of Token Pair (Nike, Nikes)

| Category | Index (i) | Number of Items Retrieved | Total Number of Items in Category | Normalized Number of Items |
|---|---|---|---|---|
| Shoes | 1 | 45 | 200 | 0.2250 |
| Women's Shirts | 2 | 23 | 400 | 0.0575 |
| Men's Shirts | 3 | 12 | 250 | 0.0480 |
| Sports bag | 4 | 3 | 50 | 0.0600 |
| Women's Shorts | 5 | 6 | 30 | 0.2000 |
| Men's Shorts | 6 | 4 | 45 | 0.0889 |
| Towels | 7 | 3 | 60 | 0.0500 |

Another search is performed using the token 'Nikes' which results in the following matching items retrieved by category:

TABLE 2

Search Results for Token 'Nikes' of Token Pair (Nike, Nikes)

| Category | Index (i) | Number of Items Retrieved | Total Number of Items in Category | Normalized Number of Items |
|---|---|---|---|---|
| Shoes | 1 | 43 | 200 | 0.2150 |
| Women's Shirts | 2 | 21 | 400 | 0.0525 |
| Men's Shirts | 3 | 12 | 250 | 0.0480 |
| Sports bag | 4 | 4 | 50 | 0.0800 |
| Women's Shorts | 5 | 5 | 30 | 0.1667 |
| Men's Shorts | 6 | 4 | 45 | 0.0889 |
| Towels | 7 | 3 | 60 | 0.0500 |

Figure 13A:
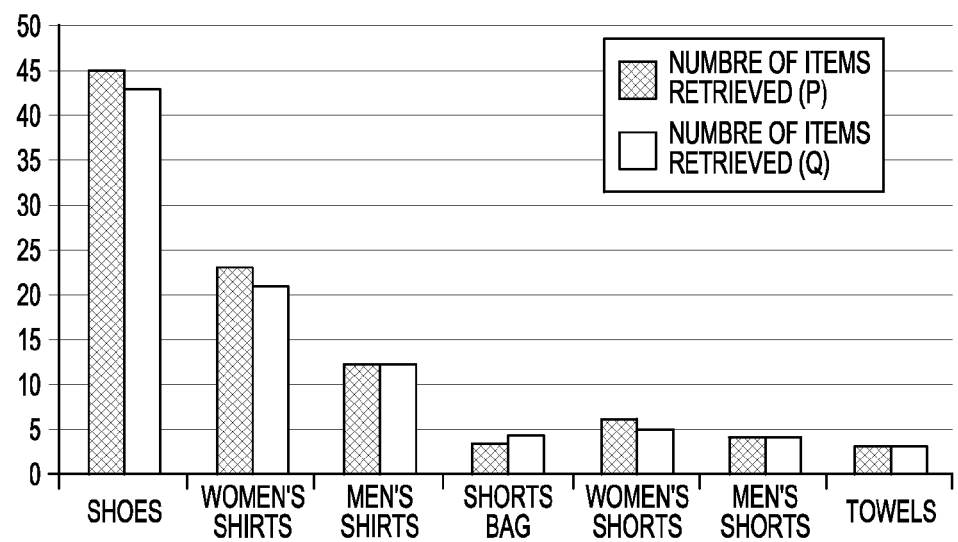
FIGS. 13A and 13B are charts illustrating, in histogram format, results of a search of items in a database using a keyword and a token of a token pair as a search criteria, and corresponding normalized results, according to an example embodiment.
Figure 13B:
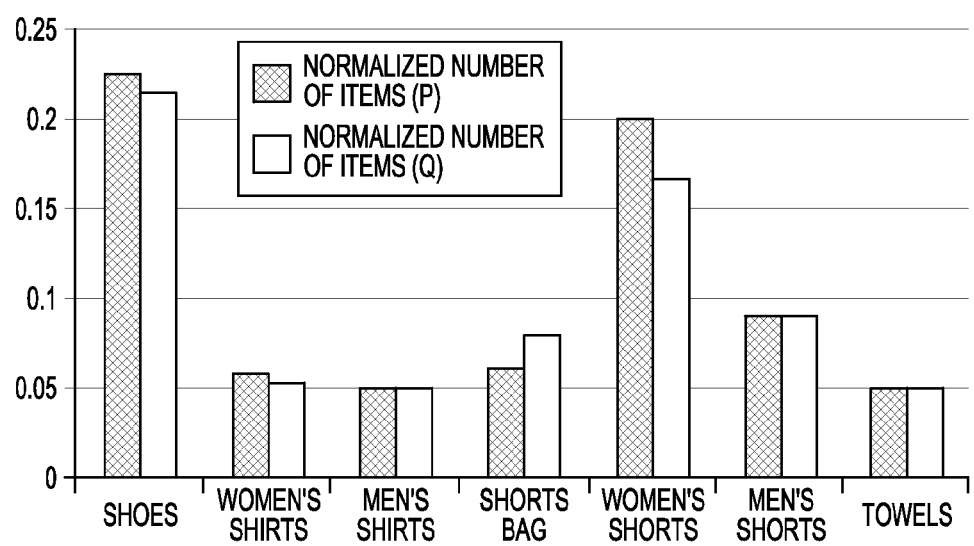

In this example, P corresponds to the normalized number of items retrieved for the keyword (Table 1) and Q corresponds to the normalized number of items retrieved for the token, the index i is the number of categories, which is this example is 7. FIG. 13A illustrates a chart of search results in histogram format plotting the number of items retrieved for searches of keyword and token as listed in Tables 1 and 2. The vertical axis identifying the number of items, the horizontal axis identifying the categories, the keyword results are in the left bars, while the token results are in the right hand bars. For example, in the category of 'towels' both the keyword and token retrieved three (3) items. Similarly, FIG. 13B illustrates a histogram of the normalized results according to the total number of items per category. For example, the normalized number of items for the category 'towels' is 0.05, which is three (3) divided by the total number of items in this category, 60. The plot of FIG. 13B, show more divergence than the plot of FIG. 13A, as the normalized results uses a common base for calculations. This means that an actual unit difference of 3 items will produce a different measure of divergence if the 3 unit are in a category having 1000 items or in a category having 5 items. In the former, the difference represents a $3/1000^{th}$ (0.003) and is much less than in the latter representing 3/5 (0.6). The goal of the divergence measure telling whether results of each search are similar or different, and the normalization of results helps to understand the relationship.

The KL divergence of the token pair (Nike, Nikes) may be calculated as:

$$D(P\|Q)=\Sigma P(i)\log(P(i)/Q(i)) \text{ for } i=1, 2, \ldots 7=0.015037, \quad (2)$$

and may also be calculated as:

$$D(Q\|P)=\Sigma Q(i)\log(Q(i)/P(i)) \text{ for } i=1, 2, \ldots 7=-0.00951, \quad (3)$$

Note, the divergence measures are not equal, as the KL divergence values are not bi-directional, meaning, that by this type of divergence measure the distance of the token from the keyword, $D(P\|Q)$, is not the same as distance of the keyword from the token, $D(Q\|P)$. While the KL divergence provides significant information on the relation between keyword and token of a token pair, there is a need for a bi-directional measure of divergence to complement or replace the KL divergence values. A bi-directional measure does not give different results depending on how the equation is applied, i.e., whether KL calculation is as in Equ. (2) or Equ. (3). Examples are provided in FIGS. 14A, 14B and 14C, which detail the various search parameters, such as originally entered query, frequency, expanded query, result size, execution time, new expanded query, new result size, new execution time and KL score calculations. The originally entered query is the keyword, which may be a word, phrase or expression, entered by the user in this search query. The frequency indicates how many times that specific query was entered in this application, such as when a user interacts with a website, during a defined time period, such as one (1) month. The query will be evaluated under two conditions: i) searching a database of items using the existing data dictionary; and ii) searching the database of items using an updated data dictionary vocabulary which incorporates information from this search query and uses the validation and confirmation techniques described herein. The old query expansion represents how a search mechanism would expand the query keyword prior to updating the data dictionary vocabulary. The result size is the number of items retrieved using the old query expansion for the search. The execution time is evaluated, specifically how long this search will take under each evaluation, i.e. old query expansion evaluation and new query expansion evaluation. In the example of Table 3, the execution time is measured in nanoseconds, and represents the processing time spent, such as CPU time, in executing the query, rather than query latency. The new query expansion is the query expansion based on the updated data dictionary, which results in retrieval of a new result size and execution time. Finally, the KL divergence values are evaluated; and as illustrated show the asymmetric nature of the KL calculations.

In another example validation process using KL calculation as in Equ. 1, 548, consider the token pair '10 lb' and '10 lbs' to illustrate the validation steps of FIG. 8. A candidate token pair (A1, A2) is given as (10 lb, 10 lbs), 550. The search query Q1 is defined by the keyword '10 lb', 552 and 554, and query Q1 as 'keyword=10 lb&histogram=category'. The search query Q2 is defined by the keyword '10 lbs', 552 and 554, and the query Q2 as 'keyword=10+ lbs&histogram=category'. The queries, Q1 and Q2 are sent to the search node to obtain item count results by category. For query Q1, a search node 206 as in FIG. 5A, such as query engine 52 as in FIG. 3, returns the following:
1. [outdoor sports]: 100
2. [indoor sports]: 50
3. [truck supplies]: 20
4. [car supplies]: 30 For query Q2, a search node 206 as in FIG. 5A, such as query engine 52 as in FIG. 3, returns the following:
1. [outdoor sports]: 80
2. [truck supplies]: 10
3. [car supplies]: 40 In this example, categories [outdoor sports] and [indoor sports] belong to a meta-category [sports], and categories [truck supplies] and [car supplies] belong to a meta-category [motors]. The individual category results are rolled up or combined into corresponding meta-category data and become, for Q1:
1. [sports]: 150
2. [motors]: 50 and for Q2:
1. [sports]: 80
2. [motors]: 50 wherein, the meta-category item counts may be used to calculated KL divergence for token pair (10 lb, 10 lbs).

Figure 10:
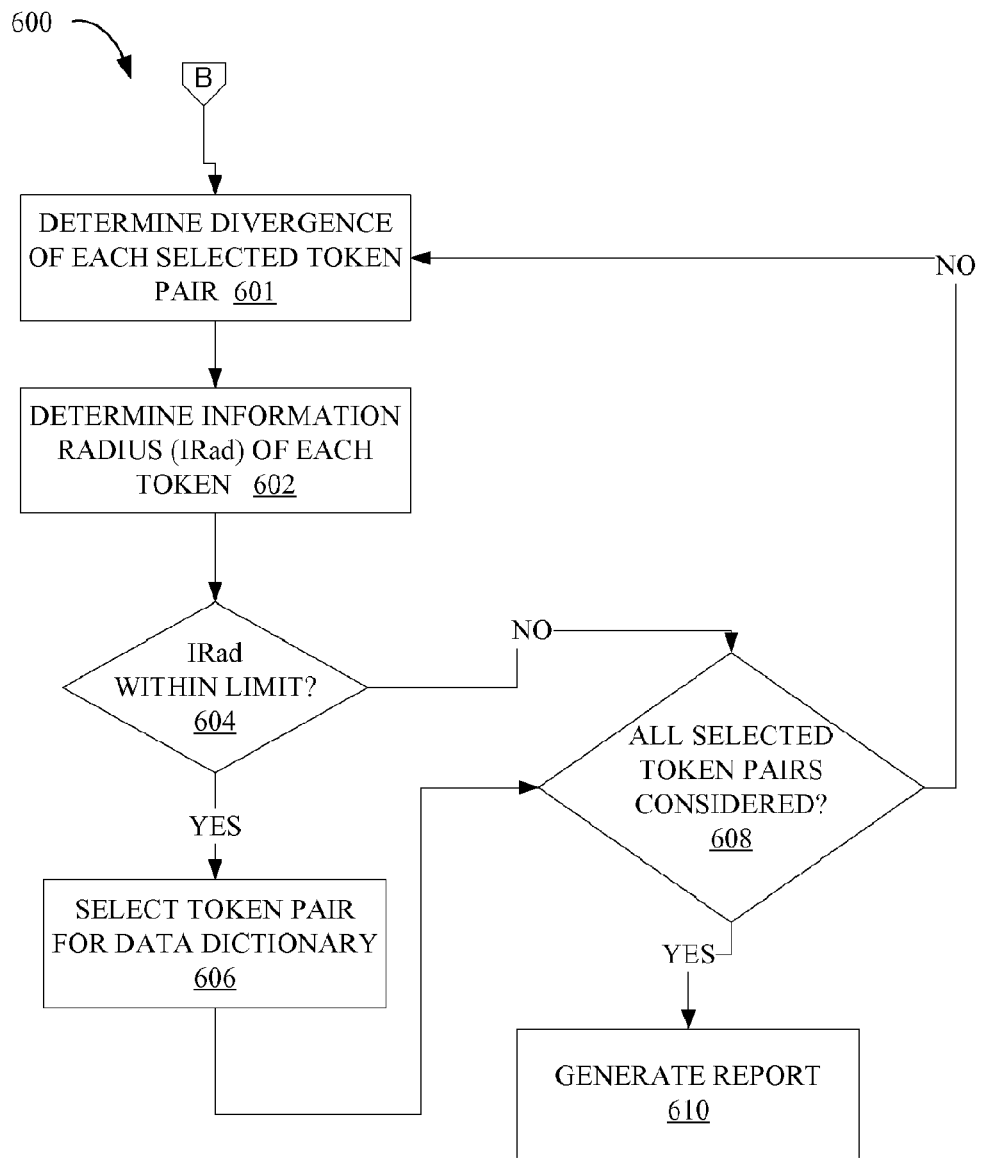
FIG. 10 illustrates a flow diagram of token validation processing, according to an example embodiment.

As mentioned above, one of the constraints of KL divergence calculations is that results are not symmetric. In one embodiment, KL divergence is a first step, or an optional step, wherein process 500 may calculate other statistics and distributions. In addition to KL divergence calculation, or in place of KL divergence calculation, and to overcome the asymmetrical results, alternate methods for validation may be employed. In one example embodiment, validation process 506 or confirmation process 508, analyzes the token pairs to determine an information radius for each token pair. Such processing is illustrated in FIG. 10. As illustrated, one example embodiment applies a Jenson-Shannon divergence technique to calculate an information radius and thus evaluate the predictability of token pairs. The Jensen-Shannon divergence is a measure of the similarity of two distributions, and calculates an Information Radius (IRad) value, which is also referred to as the IRad measure. The information radius is also known as the Jenson-Shannon divergence and as the Jensen-Shannon Distance. The IRad measure is used to quantify the difference (sometimes called divergence) between two (or more) distributions. Unlike the KL divergence value, the IRad value is a finite, symmetric value. FIG. 10 illustrates the process, 600, beginning with retrieval of divergence information for each token pair, 600.

The process first calculates the IRad measure, 602, which is based on the KL divergence, and is calculated as:

$$JS(P,Q)=0.5[D(P\|\text{avg}(P,Q))+D(Q\|\text{avg}(P,Q))] \quad (4)$$

wherein, as described with respect to the KL equation, P and Q are distributions for a token pair, i.e. keyword and token, and D is the KL divergence, which is calculated as in equation (1) given hereinabove. The variable i represents the number of categories, sometimes referred to as domains, of the search results. In this example, Equ. (1) is evaluated over $i=1, 2, \ldots N$, wherein N is the total number of categories. The distributions P and Q may be considered probability distributions as the database of items is dynamic with entries being added and deleted and therefore, P and Q each provides a measure of the probability of future distributions. The distributions describe the divergence or similarity of search results for the token pair. The variable i represents the number of categories present in the search results. Using the example for the token pair (Nike, Nikes), and using the data illustrated in Tables 1 and 2 hereinabove, IRad measures are calculated as:

$$JS(P,Q)=0.5[D(P\|\text{avg}(P,Q))+D(Q\|\text{avg}(P,Q))]$$
$$=0.000689 \quad (5)$$

and $$JS(P,Q)=0.5[D(P\|\text{avg}(P,Q))+D(Q\|\text{avg}(P,Q))]$$
$$=0.000689 \quad (6)$$

Unlike the simpler calculation of the KL measure, the IRad measure is bi-directional and Equ. (5) results in the same measure as Equ. (6).

The IRad value is calculated and then compared to a threshold or limit, 604. If the IRad is within the limit, the token pair is selected as an entry in the vocabulary of the data dictionary, 606. The process is repeated for all token pairs, 608, and generates a report, 610. Note, in alternate embodiment, various screening mechanisms may be implemented and therefore, a subset of the tokens pairs may be evaluated for IRad. In other embodiments, it may be desirable to calculate the IRad for all candidate token pairs and then compare to token pairs validated by KL divergence techniques to determine a new KL threshold value.

Note, the search results may include a large number of categories, wherein a threshold value is used to determine those categories having sufficient retrieved items to be of interest in validation or confirmation. The number of items retrieve, or the normalized value corresponding to the number items retrieved, is compared to a threshold. Those categories exceeding the threshold, or within the threshold, are used, while other categories are ignored.

An example of IRad calculations is considered in Table 3, wherein a first terms is the keyword originally entered in the search query by a user, the second term is a token expansion of the keyword and the third term is the calculated IRad value, as calculated in Equ. (4).

TABLE 3

Example of IRad Calculations

| Keyword | Token expansion | IRad value |
| --- | --- | --- |
| 12 × 12 | 12 × 12 | 0.183152 |
| abgymnic | ab gymnic | 0.042742 |
| ac dc | acdc | 0.637920 |
| addon | add on | 0.381813 |
| after shave | aftershave | 0.012109 |
| aftersun | after sun | 0.002321 |
| ag 13 | ag13 | 0.034111 |
| age 13 | age13 | 0.008737 |
| backrest | back rest | 0.113619 |

The report provides insight into the results of the validation and provides confirmation of validated token pairs. The report format may be provided in a human readable form, and may include histograms corresponding to divergence and IRad calculations. The report further facilitates modification or addition of a vocabulary to the data dictionary so as to capture the desired results for a given user search entry. As illustrated in FIG. 5B, report generation unit 246 provides confirmed token pairs for addition in data dictionary 240, wherein information is provided via bus 231. In one embodiment, report generation 246 provides instructions to data dictionary 240 indicating organization and configuration of the new entry information.

In one example, the report contains information from the processing as illustrated in FIGS. 6 to 10, including search results for each token pair from queries based on: a) the keyword (Q1), b) the token(s) (Q2), and c) a logical combination of the keyword and token(s), such as a logical OR operation (Q1 or 2). The report will further include the number of data items identified by the keyword (A1) and token (A2) as well as the number of data items identified by combinations of the keyword and token(s) (A(1 OR 2).

A final review identifies invalid or dangerous tokens, such as tokens which will result in a large unconstrained result set of data items, so as to be too inclusive and not specific enough to satisfy a search query will be eliminated. The following are some rules which may be applied to further confirm or refine the selected token pairs. Undesirable tokens may match a large number of products or data items. Typically, proper nouns and place names will be eliminated. Less common spelling mistakes are not desirable in as token pairs, but units of measure are acceptable and typically helpful. For example, analysis of historical user inputs and resultant successful searches may identify relationships where a similar context is not associated with a given token pair, such as where singular and plural forms of a brand name may not be used in similar contexts in a given application. A token pair is not selected if there are no matches with the higher level demand categories. Higher level demand categories are identified as clear dominant categories for both terms in a token pair, i.e., for keyword and token. Brand names are often excluded as token pairs, as are plural verbs and adjectives. Whereas plurals are acceptable for nouns and services. When evaluating a token pair with a unit of measure, when the unit of measure is unambiguous, then a space between the number and the unit of measure is acceptable. When the unit of measure is ambiguous, then a token pair having the space will be rejected. According to one example, if only one of the higher level categories includes books or Compact Discs (CDs) having a large inventory (i.e., data items), then token pairs may result in exorbitant number of results. Similarly, when only one higher level category matches, but none or a small number of the lower level categories match, the token pair may result in too many results without significance to the user. Unconstrained queries may result in hundreds of results and therefore, and therefore singular to plural synonyms may be acceptable, at least for two common meta categories. In one example, when there is no clear dominant category, the process may consider the top two dominant categories. Further considerations include changes in the tense or sense of the term, such as changing from a verb to a noun, will not result in a useful token pair. Additionally, it may be helpful to change possessive and other keywords having apostrophes to remove the apostrophe, such as to change 'fisherman's' to 'fishermans.'

Figure 11:
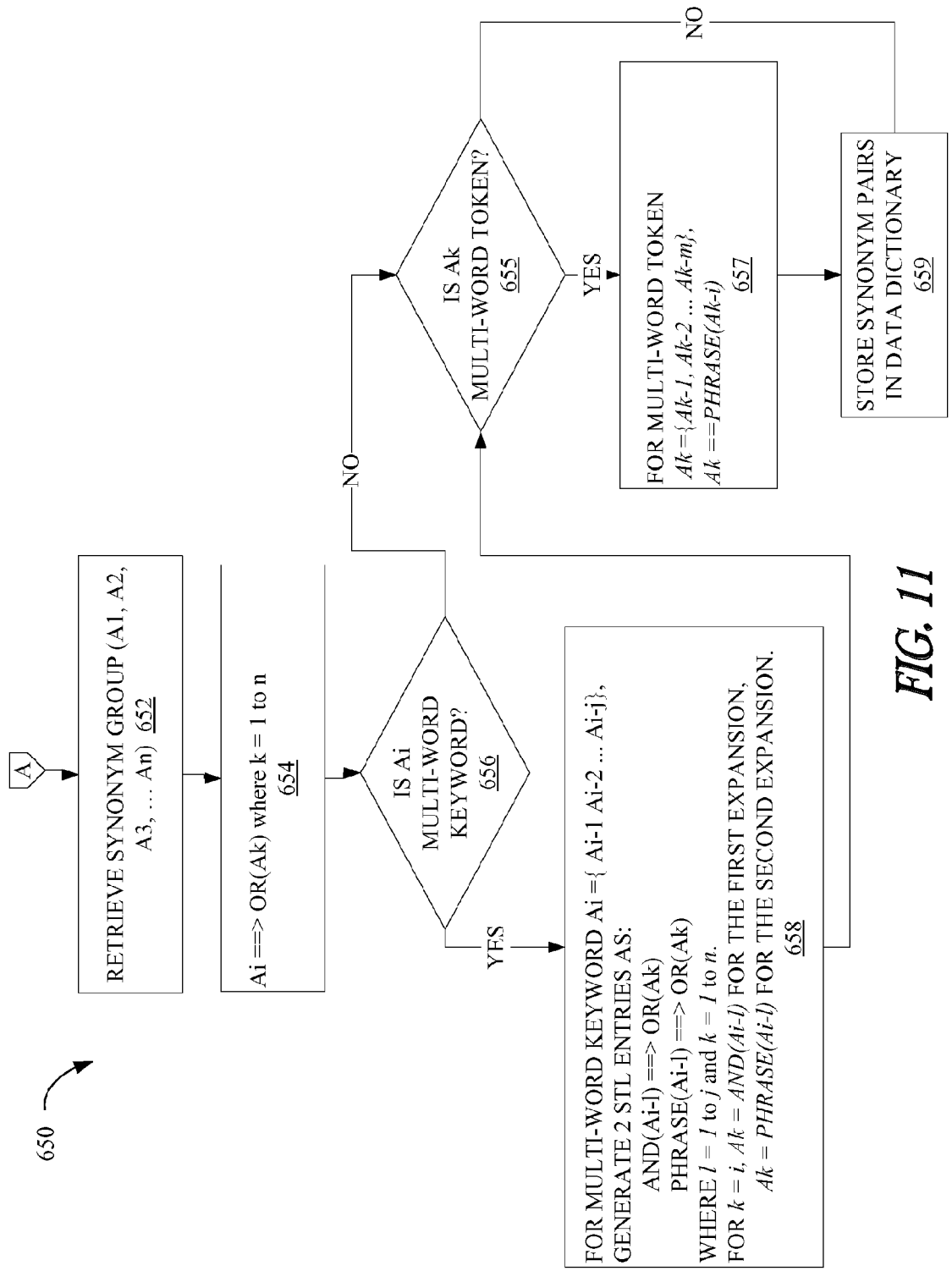
FIG. 11 illustrates a flow diagram for generation of a Stemming and Transliteration Dictionary, according to an example embodiment.

Referring again to FIG. 6, once the token list is confirmed, the token list is used to build a data dictionary by converting the vocabulary to a format adapted for searching. In one embodiment, the data dictionary is a Stemming and Transliteration (STL) dictionary that can be used by the back end servers 103 of platform 12 to improve search results for users of system 10 (FIG. 1). One or two STL entries will be generated for each keyword in a token group. As illustrated in FIG. 11, the process 650 for building the data dictionary includes retrieving the synonym group A1, A2, A3 . . . An, where n is the number of STL entries to generate, 652. The synonym group is also a token group or a token set, wherein a token set includes one keyword with multiple tokens. In this example, the following rules are applied to generation of each entry:

1. Ai==>OR(Ak) where k=1 to n, 654.
2. Ai, Ak may be either single word keyword or multiple word keyword. A single word keyword or token has no spaces or dashes, such as '10 lb.' If Ai is a multiple word keyword, 656, such as composed by Ai-1 Ai-2 ... Ai-j, multiple data dictionary entries will get generated, and given as:

AND(Ai-1)==>OR(Ak)
PHRASE(Ai-1)==>OR(Ak), where l=1 to j and k=1 to n.

3. When k=i, Ak=AND(Ai-1) for the first expansion, and Ak=PHRASE(Ai-1) for the second one, 658.
4. If Ak is a multi word token, 655, composed by Ak-1, Ak-2 ... Ak-m, PHRASE(Ak-i) is used to take place of Ak, 657.
5. After evaluation of the synonym group, and replacements made according to these rules, the synonym pairs are stored in a data dictionary, 659.

As an example, consider the synonym group {A1=10 lb}, {A2=10 lb}, and {A3=10 lbs}, wherein n=3. Application of the rules results in the following entries in the STL:

1. 10 lb==>OR(10 lb,PHRASE(10,lb),PHRASE(10,lbs))
2. AND(10,lb)==>OR(10 lb,AND(10,lb),PHRASE(10,lbs))
   PHRASE(10,lb)==>OR(10 lb,PHRASE(10,lb),PHRASE(10,lbs))
   AND(10,lbs)==>OR(10 lb,PHRASE(10,lb),AND(10,lbs))
   PHRASE(10,lbs)==>OR(10 lb,PHRASE(10,lb),PHRASE(10,lbs))

Upon completion of the data dictionary, such as an STL dictionary, the token pairs are stored in the data dictionary, 659. In this way, when a buyer at client machine 20, of FIG. 4, enters a search query through communication module 40, the back end servers 103 are able to identify the data items using a query engine 52, search index engine 54, and using the data dictionary as stored in data item search information 66 in databases 36. The data dictionary may be updated daily, hourly, monthly or on demand as desired to enhance search capabilities of the network.

Figure 12:
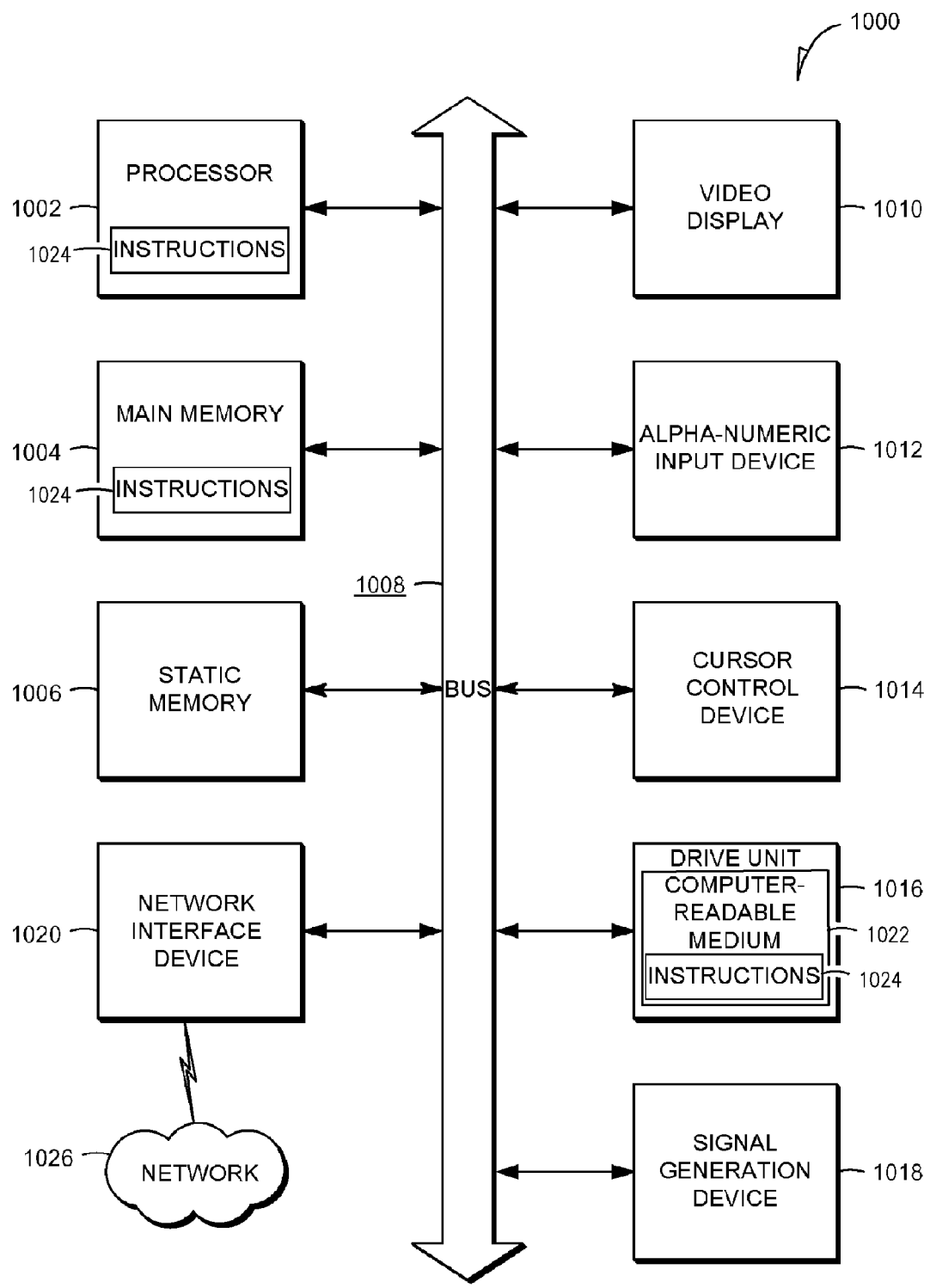
FIG. 12 is a block diagram of a machine, according to an example embodiment, including instructions to perform any one or more of the methodologies described herein.

FIG. 12 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term 'machine' shall also be taken to include any collection of machines that individually or jointly execute a set (or multiple sets) of instructions to perform any one or more of the methodologies discussed herein.

The example computer system 1000 includes a processor 1002 (e.g., a Central Processing Unit (CPU), a Graphics Processing Unit (GPU) or both), a main memory 1004 and a static memory 1006, which communicate with each other via a bus 1008. The computer system 1000 may further include a video display unit 1010 (e.g., a Liquid Crystal Display (LCD) or a Cathode Ray Tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020. In one example, the methods described herein are provided to a user, such as a seller, for determining keywords to apply to a product, such as a product for sale. This may be a tool or widget, wherein at least a portion of the software to implement the methods may be downloaded to a client machine. In another example, this is a service offered to sellers, wherein calculation is performed within the network, and a user interface is provided, such as a web interface, which requests and receives information from a user and provides suggestions of descriptive terms for use. In one example, a seller may use these methods to determine a popular version of an item during listing time.

Certain systems, apparatus or processes are described herein as being implemented in one or more "modules." A module is a unit of distinct functionality that is performed through software, firmware, hardware, or any combination thereof. When the functionality of a module is performed in any part through software or firmware, the module includes at least one machine readable medium bearing instructions that when executed by one or more processors, performs that portion of the functionality implemented in software or firmware. The modules may be regarded as being communicatively coupled to one another to at least the degree needed to implement the described functionalities.

Thus, a method and system to generate a data dictionary using token generation and validation, the data dictionary used to identify data items is described. Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

We claim:

1. A method, comprising:
    executing instructions on a computing platform, the instructions comprising:
        receiving search query inputs to search a database of data items, the database having categories and an associated data dictionary of terms to add to the search query inputs for searching the database;
        generating a set of token pairs based on the search query inputs, each token pair comprising a keyword from at least one search query input and a token, the token being a synonym of the keyword;
        validating the set of token pairs by:
            calculating a bi-directional divergence measure for the each of the token pairs, the bi-directional divergence being a predictability indicator for the token pairs for use in a search query; and calculation of the bi-directional divergence measure further comprising:
                performing a search using a keyword of a token pair as a search criteria;

determining a first distribution (P) of search results for the keyword, the first distribution over a plurality of categories;
performing a search using a token of the token pair as a search criteria;
determining a second distribution (Q) of search results for the token, the second distribution over the plurality of categories;
calculating the bi-directional divergence measure as an Information Radius (IRad) value as:

$$IRad=0.5[D(P\|avg(P,Q))+D(Q\|avg(P,Q))],$$

wherein avg(P,Q) is an average of the first distribution and the second distribution,
wherein D is Kullback-Liebler divergence calculated as:

$$D(P\|Q)=\Sigma P(i)\log(P(i)/Q(i)),$$

wherein an index i=1, 2, ... N, and N is the number of categories in the plurality of categories;
comparing the bi-directional divergence measure for each of the token pairs to a first limit, wherein a token pair having a bi-directional divergence measure below the first limit is a valid token pair for the data dictionary;
entering validated token pairs into the data dictionary to form an updated data dictionary; and
applying the updated data dictionary to search queries.

2. The method of claim 1, wherein generating a set of token pairs results in a plurality of token pairs having a same keyword.

3. The method of claim 1, further comprising generating a, report of the IRad values, the report comprising an IRad value for each token pair over multiple categories.

4. The method of claim 1, wherein validating the set of token pairs further comprises:
calculating a probability divergence value for the token pairs in searching the database;
comparing the divergence value to a divergence threshold, wherein token pairs having divergence values exceeding the divergence threshold are valid token pairs for the data dictionary.

5. The method of claim 1, wherein the data dictionary is a stemming and transliteration dictionary.

6. The method of claim 1, further comprising:
applying at least one token generation rule to the validated token pairs to identify invalid token pairs.

7. The method of claim 6, wherein an invalid token pair is one resulting in a large number of data items in unrelated categories as a result from search.

8. The method of claim 1, wherein generating the set of token pairs comprises comparing the received search query inputs to description information for data items stored in the database.

9. The method of claim 1, wherein validating further comprises for each token pair generating a search query for each keyword to generate search results from the data items stored in the database.

10. The method of claim 1, wherein validating token pairs further comprises comparing the Mad values to a threshold, wherein token pairs having an Iliad value exceeding the threshold are discarded and not used in the data dictionary.

11. A system including:
a plurality of modules, each module comprising instructions retained on at least one machine-readable storage medium, that when executed by a machine perform identified operations, wherein the modules comprise:
a candidate list generator module to generate a list of keywords from search query information, and to generate token pairs including a keyword from the list of keywords and a token, the token being a synonym of the keyword;
a validation module to calculate a divergence value for each token pair and generate a list of validated token pairs having divergence values within a divergence threshold, the divergence value calculated using a bi-directional divergence measure calculated as an Information Radius (IRad) value by:
performing a search using a keyword of a token pair as a search criteria;
determining a first distribution (P) of search results for the keyword, the first distribution over a plurality of categories;
performing a search using a token of the token pair as a search criteria;
determining a second distribution (Q) of search results for the token, the second distribution over the plurality of categories;
calculating the bi-directional divergence measure as an Information Radius (IRad) value as:

$$IRad=0.5[D(P\|avg(P,Q)+D(Q\|avg(P,Q))],$$

wherein avg(P,Q) is an average of the first distribution and the second distribution,
wherein D is Kullback-Liebler divergence calculated as:

$$D(P\|Q)=\Sigma P(i)\log(P(i)/Q(i)),$$

wherein an index i=1, 2, ... N, and N is the number of categories in the plurality of categories; and
a data dictionary module to receive the validated token pairs as entries in a vocabulary, and to provide the token pairs in response to a search query containing a keyword corresponding to at least one entry in the vocabulary.

12. The system of claim 11, wherein the candidate list generator module comprises candidate selection rules, including vocabulary generation rules for processing search query terms to identify keywords, and token generation rules for generating synonyms of the keywords.

13. The system of claim 12, wherein the candidate list module is further adapted to recursively apply candidate selection rules to token pairs.

14. The system of claim 11, wherein the system comprises a database and the candidate list generator module is further to receive demand information and supply information, wherein the demand information is to retrieve information from the database and the supply information is descriptor information for data items stored in the database.

15. The system of claim 14, wherein the system is an ecommerce system, data items represent products sold in the ecommerce system, and a database comprises multiple data items, wherein the products are categorized according to a hierarchy which is included as supply information.

16. The system of claim 14, wherein each search query uses at least one vocabulary in the data dictionary for searching the database.

17. An ecommerce system having a database comprising multiple data items, wherein the data items represent products sold in the ecommerce system, the system including:

a plurality of modules, each module comprising instructions retained on at least one non-transitory machine-readable storage medium, that when executed by a machine perform identified operations, wherein the modules comprise:
a candidate list generator module to generate a list of keywords from search query information, and to generate token pairs including a keyword from the list of keywords and a token, the token being a synonym of the keyword, the candidate list generator module further- to receive demand information and supply information, wherein the demand information is information retrieved from query logs maintained for user-provided query entries stored in the database and the supply information is seller-provided descriptor information for the data items stored in the database, the candidate list generator module further to recursively apply candidate selection rules to token pairs across multiple categories using the demand information;
a validation module to calculate a divergence value for each token pair across multiple categories using the demand information and generate a list of validated token pairs having divergence values within a divergence threshold, the divergence value calculated using a bi-directional divergence measure; and
a data dictionary module to receive the validated token pairs as entries in a vocabulary, and to provide the token pairs in response to a search query containing a keyword corresponding to at least one entry in the vocabulary.

* * * * *

UNITED STATES PATENT AND TRADEMARK OFFICE
CERTIFICATE OF CORRECTION

| | | |
|---|---|---|
| PATENT NO. | : 8,145,662 B2 | Page 1 of 1 |
| APPLICATION NO. | : 12/347938 | |
| DATED | : March 27, 2012 | |
| INVENTOR(S) | : Yan Chen et al. | |

Figure 3:
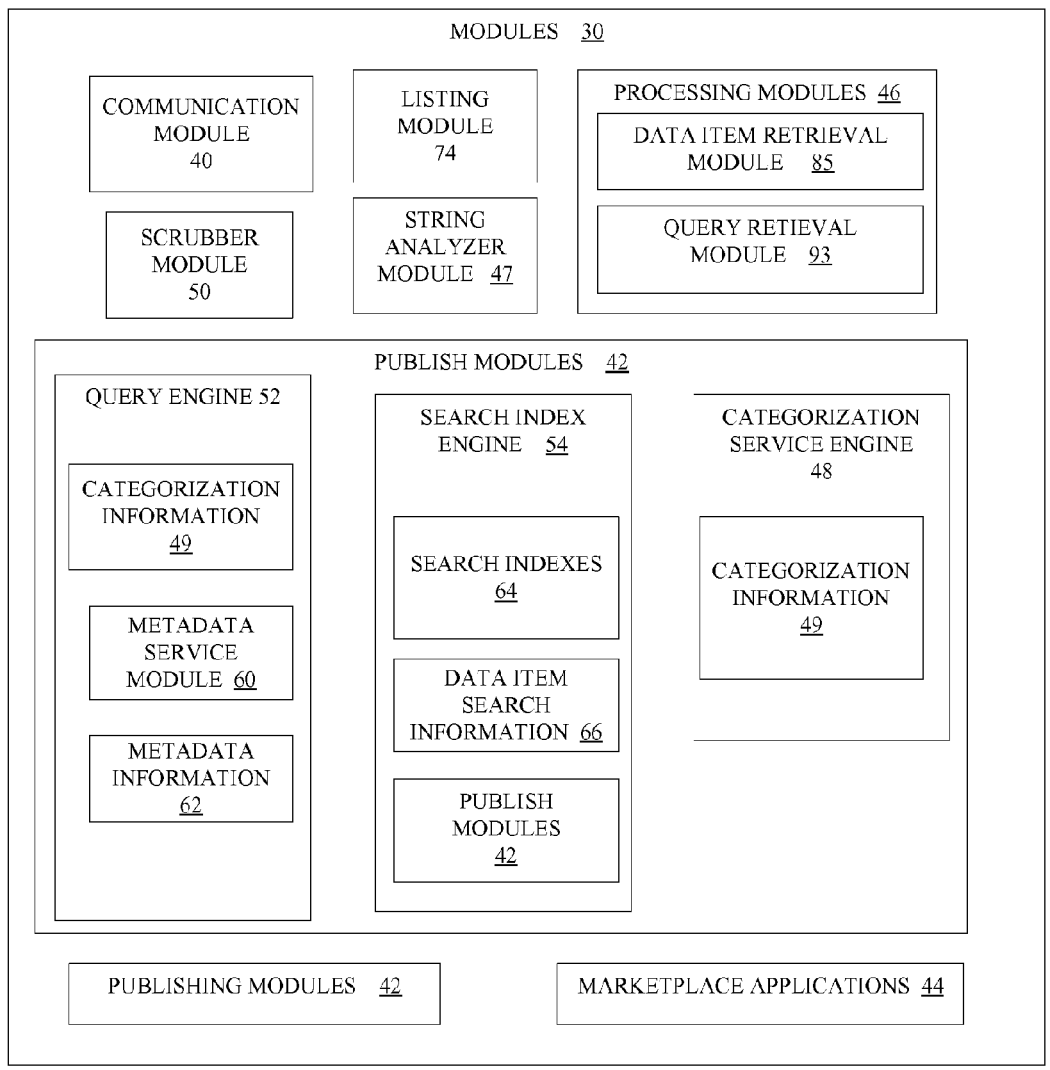
FIG. 3 is a block diagram illustrating modules and engines, according to an example embodiment.

It is certified that error appears in the above-identified patent and that said Letters Patent is hereby corrected as shown below:

On Sheet 3 of 16, Box No. 93, Figure 3, line 1, delete "RETIEVAL" and insert -- RETRIEVAL --, therefor.

On Sheet 14 of 16, Figure 13A, line 1, delete "NUMBRE" and insert -- NUMBER --, therefor.

On Sheet 14 of 16, Figure 13A, line 3, delete "NUMBRE" and insert -- NUMBER --, therefor.

In column 1, lines 32-33, delete "architecture;" and insert -- architecture. --, therefor.

In column 1, lines 39-40, delete "embodiment;" and insert -- embodiment. --, therefor.

In column 7, line 13, delete "10. and" and insert -- 10 and --, therefor.

In column 25, line 34, in Claim 3, delete "a," and insert -- a --, therefor.

In column 27, lines 10-11, in Claim 17, delete "further-" and insert -- further --, therefor.

Signed and Sealed this
Third Day of July, 2012

David J. Kappos
*Director of the United States Patent and Trademark Office*